(12) United States Patent
Lin

(10) Patent No.: US 12,519,605 B2
(45) Date of Patent: Jan. 6, 2026

(54) METHOD AND APPARATUS FOR TRANSMISSION DIRECTION INDICATION IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

(*) Notice: Subject to any disclaimer, the term of this patent is extended or adjusted under 35 U.S.C. 154(b) by 428 days.

(21) Appl. No.: 17/983,851

(22) Filed: Nov. 9, 2022

(65) Prior Publication Data
US 2023/0145355 A1    May 11, 2023

Related U.S. Application Data

(60) Provisional application No. 63/278,050, filed on Nov. 10, 2021.

(51) Int. Cl.
*H04L 5/14* (2006.01)

(52) U.S. Cl.
CPC ...................... *H04L 5/14* (2013.01)

(58) Field of Classification Search
CPC ......... H04L 5/14; H04L 5/0094; H04L 5/001; H04L 5/0053; H04L 5/1469; H04L 5/0048; H04L 5/0092; H04B 7/0413; H04B 7/0617; H04W 72/231; H04W 72/0446
See application file for complete search history.

(56) References Cited

U.S. PATENT DOCUMENTS

| | | | |
|---|---|---|---|
| 11,832,330 B2 * | 11/2023 | Zhang | H04B 7/0695 |
| 2020/0052865 A1 | 2/2020 | Liou et al. | |
| 2020/0214006 A1 | 7/2020 | Choi et al. | |
| 2020/0267764 A1 | 8/2020 | Rastegardoost et al. | |
| 2021/0400637 A1 * | 12/2021 | Abotabl | H04W 72/0446 |
| 2023/0072920 A1 * | 3/2023 | Zhang | H04B 7/06956 |

FOREIGN PATENT DOCUMENTS

WO    2021188785 A1    9/2021

OTHER PUBLICATIONS

Office Action to the corresponding Chinese Patent Application rendered by China National Intellectual Property Administration (CNIPA) on Oct. 8, 2024, 6 pages.
NTT Docomo, R1-2105705, Discussion on duplex operation for RedCap, 3GPP TSG RAN WG1 #105-e, May 12, 2021, 4 pages.
(Continued)

*Primary Examiner* — Nizam U Ahmed
(74) *Attorney, Agent, or Firm* — Skaar Ulbrich Macari, P.A.

(57) ABSTRACT

Methods, systems, and apparatuses are provided for transmission direction indication in a wireless communication system to improve indication efficiency in transmission direction for duplexing enhancement. A User Equipment (UE) in a wireless communication system comprises receiving indication(s) of which symbol duplex enhancement is applicable, performing UL transmission on a first Downlink (DL) symbol if/when duplex enhancement is applicable for the first DL symbol, and canceling Uplink (UL) transmission on a second DL symbol if/when duplex enhancement is not applicable for the second DL symbol.

18 Claims, 7 Drawing Sheets

(56) References Cited

OTHER PUBLICATIONS

Asia Pacific Telecom, FGI, R1-2105823, Discussion on aspects related to duplex operation, 3GPP TSG RAN WG1 #105-e, May 10-May 27, 2021, 3 pages.
Office Action to the corresponding Chinese Patent Application rendered by the State Intellectual Property Office of China (SIPO) on Apr. 7, 2024, 6 pages.
Office Action to the corresponding Korean patent application rendered by the Korean Intellectual Property Office (KIPO) on Jan. 8, 2025, 10 pages (including English translation).
Sharp, R1-1910935, PUSCH enhancements for NR URLLC, 3GPP TSG RAN WG1 #98bis, 3GPP (Server Disclosure Date: Oct. 8, 2019), 12 pages.
Moderator (Ericsson), R1-2101851, FL summary #3 for UE complexity reduction for RedCap, 3GPP TSG RAN WG1 #104-E, 3GPP (Server Disclosure Date: Feb. 5, 2021), 55 pages.
WILUS Inc., R1-1911317, On PUSCH enhancement for NR URLLC, 3GPP TSG RAN WG1 #98bis, 3GPP (Server Disclosure Date: Oct. 8, 2019), 8 pages.
Lenovo; 3GPP TSG RAN WG1#101-e; Email discussion [101-e-NR-unlic-NRU-DL_Signals_and_Channels-02] on DCI format 2_0, COT indication and RB set indication; May 25-Jun. 5, 2020; 28 pages.

\* cited by examiner

METHOD AND APPARATUS FOR TRANSMISSION DIRECTION INDICATION IN A WIRELESS COMMUNICATION SYSTEM

CROSS-REFERENCE TO RELATED APPLICATIONS

The present application claims priority to and the benefit of U.S. Provisional Patent Application Ser. No. 63/278,050, filed Nov. 10, 2021, which is fully incorporated herein by reference.

FIELD

This disclosure generally relates to wireless communication networks and, more particularly, to a method and apparatus for transmission direction indication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmission direction indication in a wireless communication system to improve indication efficiency in transmission direction for duplexing enhancement.

In various embodiments, with this and other concepts, systems, and methods of the present invention, a method for a User Equipment (UE) in a wireless communication system comprises receiving indication(s) of which symbol duplex enhancement is applicable, performing UL transmission on a first Downlink (DL) symbol if/when duplex enhancement is applicable for the first DL symbol, and canceling Uplink (UL) transmission on a second DL symbol if/when duplex enhancement is not applicable for the second DL symbol.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.211 V15.7.0, "NR physical channels and modulation"; [2] 3GPP TS 38.213 V16.6.0, "NR Physical layer procedures for control"; and [3] RP-212707, "Draft SID on Evolution of NR Duplex Operation". The standards and documents listed above and herein are hereby expressly and fully incorporated herein by reference in their entirety.

Figure 1:
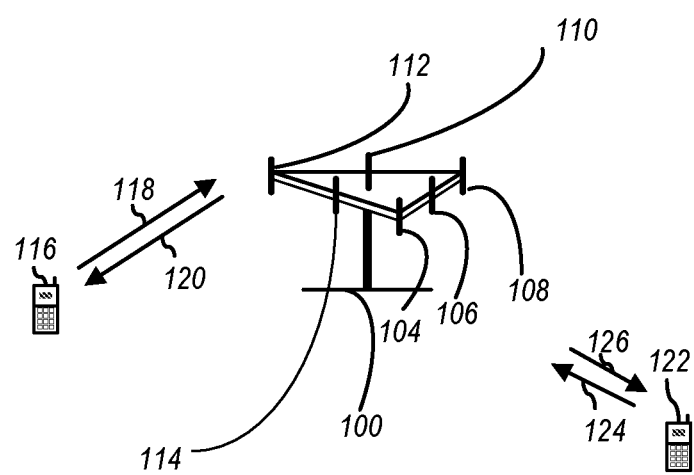
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
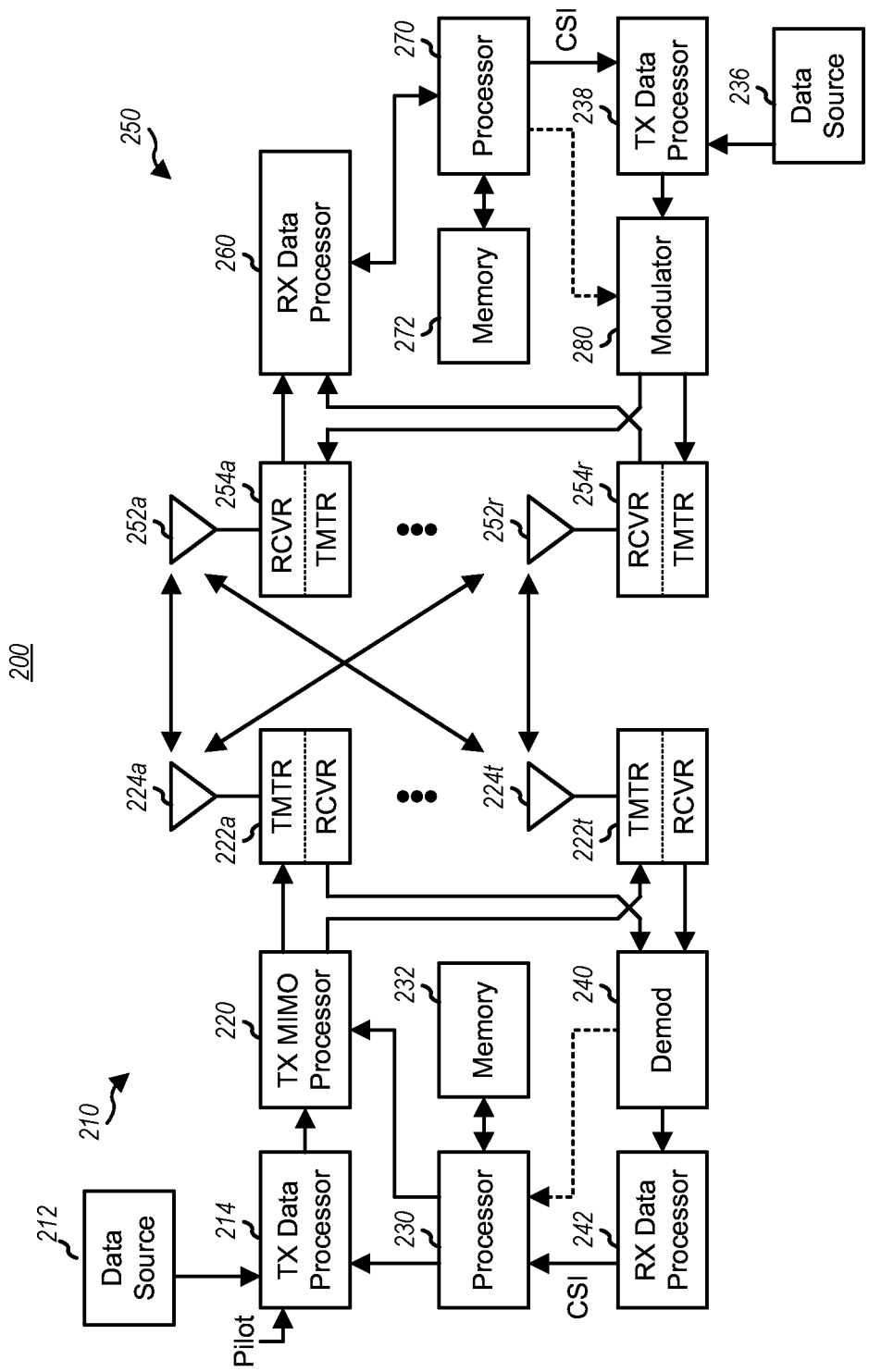
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams.

The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
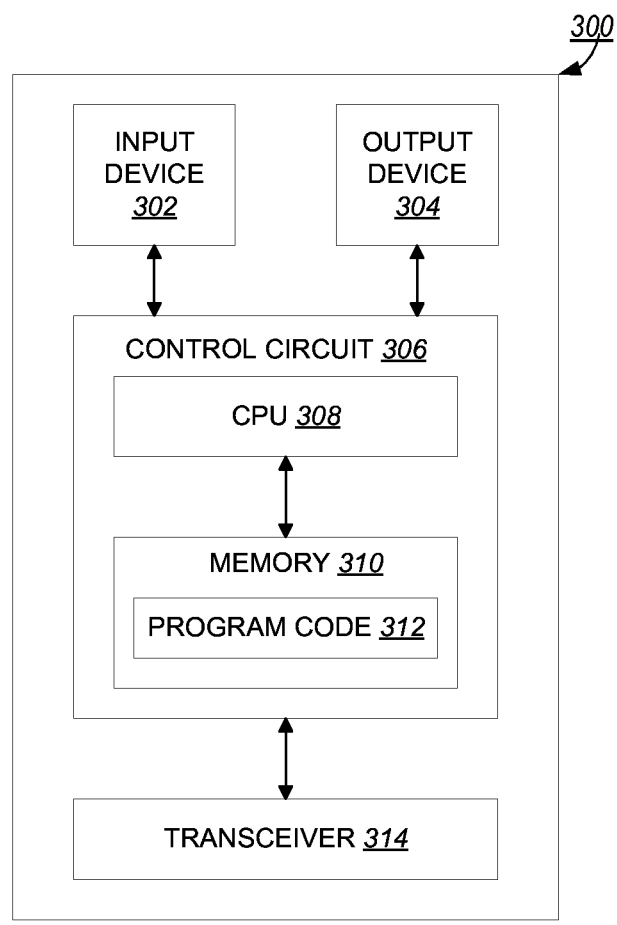
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
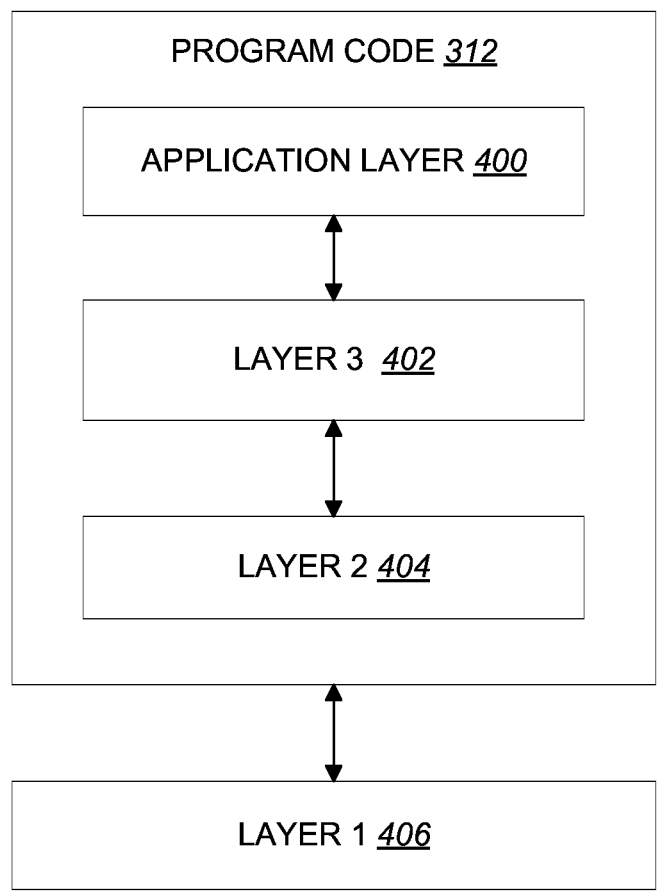
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion

406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

Frame structure used in New RAT (NR) for 5G, to accommodate various types of requirements (e.g., [1]3GPP TS 38.211 V15.7.0, "NR physical channels and modulation") for time and frequency resource, e.g., from ultra-low latency (~0.5 ms) to delay-tolerant traffic for Machine Type Communication (MTC), from high peak rate for enhanced Mobile Broadband (eMBB) to very low data rate for MTC. An important focus of this study is low latency aspect, e.g., short Transmission Time Interval (TTI), while other aspect of mixing/adapting different TTIs can also be considered in the study. In addition to diverse services and requirements, forward compatibility is an important consideration in initial NR frame structure design as not all features of NR would be included in the beginning phase/release.

Reducing latency of protocol is an important improvement between different generations/releases, which can improve efficiency as well as meeting new application requirements, e.g., real-time service. An effective method frequently adopted to reduce latency is to reduce the length of TTIs, from 10 ms in 3G to 1 ms in LTE.

When it comes to NR, the story becomes somehow different, as backward compatibility is not a must. Numerology can be adjusted so that reducing symbol number of a TTI would not be the only tool to change TTI length. Using LTE numerology as an example, it comprises 14 Orthogonal Frequency Division Multiplexing (OFDM) symbol in 1 ms and a subcarrier spacing of 15 KHz. When the subcarrier spacing goes to 30 KHz, under the assumption of same FFT size and same Cyclic Prefix (CP) structure, there would be 28 OFDM symbols in 1 ms, equivalently the TTI become 0.5 ms if the number of OFDM symbol in a TTI is kept the same. This implies the design between different TTI lengths can be kept common, with good scalability performed on the subcarrier spacing. Of course, there would always be trade-off for the subcarrier spacing selection, e.g., Fast Fourier Transform (FFT) size, definition/number of Physical Resource Block (PRB), the design of CP, supportable system bandwidth, etc. While as NR considers larger system bandwidth, and larger coherence bandwidth, inclusion of a larger sub carrier spacing is a natural choice.

More details of NR frame structure, channel and numerology design is given below from [1] 3GPP TS 38.211 V15.7.0, "NR physical channels and modulation":

\* \* \* Quotation Start \* \* \*

4.3.1 Frames and Subframes

Downlink and uplink transmissions are organized into frames with $T_f = (\Delta f_{max} N_f/100) \cdot T_c = 10$ ms duration, each consisting of ten subframes of $T_{sf} = (\Delta f_{max} N_f/1000) \cdot T_c = 1$ ms duration. The number of consecutive OFDM symbols per subframe is $N_{symb}^{subframe,\mu} = N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA} = (N_{TA} + N_{TA,offset}) T_c$ before the start of the corresponding downlink frame at the UE where $N_{TA,offset}$ is given by [5, TS 38.213].

Figure 5:
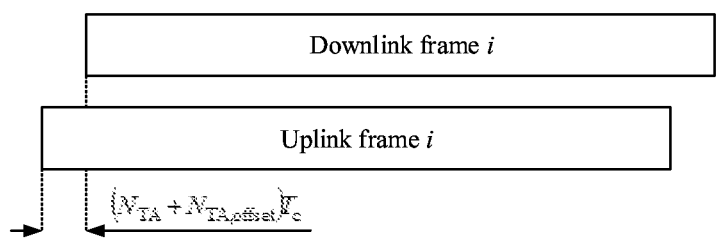
FIG. 5 is a reproduction of FIG. 4.3.1-1: Uplink-downlink timing relation, from [1] 3GPP TS 38.211 V15.7.0, "NR physical channels and modulation".

FIG. 5 is a reproduction of FIG. 4.3.1-1: Uplink-downlink timing relation, from [1] 3GPP TS 38.211 V15.7.0, "NR physical channels and modulation".

4.3.2 Slots

For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Tx-Rx} T_c$ after the end of the last received downlink symbol in the same or different cell within the group of cells where $N_{Tx-Rx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx} T_c$ after the end of the last transmitted uplink symbol in the same or different cell within the group of cells where $N_{Tx-Rx}$ is given by Table 4.3.2-3.

A UE not capable of full-duplex communication is not expected to transmit in the uplink earlier than $N_{Rx-Tx} T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx} T_c$ after the end of the last transmitted uplink symbol in the same cell where $N_{Tx-Rx}$ is given by Table 4.3.2-3.

TABLE 4.3.2-1

Number of OFDM symbols per slot, slots per frame, and slots per subframe for normal cyclic prefix.

| $\mu$ | $N_{symb}^{slot}$ | $x_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame, and slots per subframe for extended cyclic prefix.

| $\mu$ | $N_{symb}^{slot}$ | $x_{slot}^{frame,\mu}$ | $N_{slot}^{subframe,\mu}$ |
| --- | --- | --- | --- |
| 2 | 12 | 40 | 4 |

TABLE 4.3.2-3

Transition time $N_{Rx-Tx}$ and $N_{Tx-Rx}$

| Transition time | FR1 | FR2 |
| --- | --- | --- |
| $N_{Tx-Rx}$ | 25600 | 13792 |
| $N_{Rx-Tx}$ | 25600 | 13792 |

4.4.4.3 Common Resource Blocks

Common resource blocks are numbered from 0 and upwards in the frequency domain for subcarrier spacing configuration $\mu$. The center of subcarrier 0 of common resource block 0 for subcarrier spacing configuration $\mu$ coincides with 'point A'. The relation between the common resource block number $n_{CRB}^{\mu}$ in the frequency domain and resource elements (k, l) for subcarrier spacing configuration $\mu$ is given by $$n_{CRB}^{\mu} = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration $\mu$ are defined within a bandwidth part and numbered from 0 to $N_{BWP,i}^{size,\mu}-1$ where i is the number of the bandwidth part. The relation between the physical resource block $n_{PRB}^{\mu}$ in bandwidth part i and the common resource block $n_{CRB}^{\mu}$ is given by $$n_{CRB}^{\mu} = n_{PRB}^{\mu} + N_{BWP,i}^{start,\mu}$$

where $N_{BWP,i}^{start,\mu}$ is the common resource block where bandwidth part starts relative to common resource block 0. When there is no risk for confusion the index $\mu$ may be dropped.

4.4.4.5 Virtual Resource Blocks

Virtual resource blocks are defined within a bandwidth part and numbered from 0 to $N_{BWP,i}^{size}-1$ where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{start,\mu}$ in a bandwidth part shall fulfil $N_{grid,x}^{start,\mu} \leq N_{BWP,i}^{start,\mu} < N_{grid,x}^{start,\mu} + N_{grid,x}^{start,\mu}$ and $N_{grid,x}^{start,\mu} < N_{BWP,i}^{start,\mu} + N_{BWP,i}^{start,\mu} \leq N_{grid,x}^{start,\mu} + N_{grid,x}^{start,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index y may be dropped from $N_{BWP,i}^{start,\mu}$, $N_{BWP,i}^{start,\mu}$, $N_{grid,x}^{start,\mu}$, and $N_{grid,x}^{start,\mu}$.

* * * Quotation End * * *

Slot format information (SFI) is introduced to indicate transmission direction for a symbol(s), e.g. DL, UL or Flexible. SFI could be indicated or revealed by several signals, such as RRC configuration, DCI for SFI, scheduling DCI. Some collision handling would be then required if more than one direction is indicated to a symbol. More details regarding SFI and collision handling rule is quoted below from [2] 3GPP TS 38.213 V16.6.0, "NR Physical layer procedures for control":

* * * Quotation Start * * *

11.1 Slot Configuration

A slot format includes downlink symbols, uplink symbols, and flexible symbols.

The following are applicable for each serving cell.

If a UE is provided tdd-UL-DL-ConfigurationCommon, the UE sets the slot format per slot over a number of slots as indicated by tdd-UL-DL-ConfigurationCommon.

The tdd-UL-DL-ConfigurationCommon provides
  a reference SCS configuration $\mu_{ref}$ by referenceSubcarrierSpacing
  a pattern1.

The pattern1 provides
  a slot configuration period of P msec by dl-UL-TransmissionPeriodicity
  a number of slots $d_{slots}$ with only downlink symbols by nrofDownlinkSlots
  a number of downlink symbols $d_{sym}$ by nrofDownlinkSymbols
  a number of slots $u_{slots}$ with only uplink symbols by nrofUplinkSlots
  a number of uplink symbols $u_{sym}$ by nrofUplinkSymbols A value P=0.625 msec is valid only for $\mu_{ref}=3$. A value P=1.25 msec is valid only for $\mu_{ref}=2$ or $\mu_{ref}=3$. A value P=2.5 msec is valid only for $\mu_{ref}=1$, or $\mu_{ref}=2$, or $\mu_{ref}=3$.

A slot configuration period of P msec includes $S=P \cdot 2^{\mu_{ref}}$ slots with SCS configuration $\mu_{ref}$. From the S slots, a first $d_{slots}$ slots include only downlink symbols and a last $u_{slots}$ slots include only uplink symbols. The $d_{sym}$ symbols after the first $d_{slots}$ slots are downlink symbols. The $u_{sym}$ symbols before the last $u_{slots}$ slots are uplink symbols. The remaining $(S-d_{slots}-u_{slots}) \cdot N_{symb}^{slot} - d_{sym} - u_{sym}$ are flexible symbols.

The first symbol every 20/P periods is a first symbol in an even frame.

If tdd-UL-DL-ConfigurationCommon provides both pattern2 and pattern2, the UE sets the slot format per slot over a first number of slots as indicated by pattern1 and the UE sets the slot format per slot over a second number of slots as indicated by pattern2.

The pattern2 provides
- a slot configuration period of $P_2$ msec by dl-UL-TransmissionPeriodicity
- a number of slots $d_{slots,2}$ with only downlink symbols by nrofDownlinkSlots
- a number of downlink symbols $d_{sym,2}$ by nrofDownlinkSymbols
- a number of slots $u_{slots,2}$ with only uplink symbols by nrofUplinkSlots
- a number of uplink symbols $u_{sym,2}$ by nrofUplinkSymbols The tdd-UL-DL-ConfigurationDedicated provides
- a set of slot configurations by slotSpecificConfigurationsToAddModList
- for each slot configuration from the set of slot configurations
  - a slot index for a slot provided by slotIndex
  - a set of symbols for a slot by symbols where
    - if symbols=allDownlink, all symbols in the slot are downlink
    - if symbols=allUplink, all symbols in the slot are uplink
    - if symbols=explicit, nrofDownlinkSymbols provides a number of downlink first symbols in the slot and nrofUplinkSymbols provides a number of uplink last symbols in the slot. If nrofDownlinkSymbols is not provided, there are no downlink first symbols in the slot and if nrofUplinkSymbols is not provided, there are no uplink last symbols in the slot. The remaining symbols in the slot are flexible For each slot having a corresponding index provided by slotIndex, the UE applies a format provided by a corresponding symbols. The UE does not expect tdd-UL-DL-ConfigurationDedicated to indicate as uplink or as downlink a symbol that tdd-UL-DL-ConfigurationCommon indicates as a downlink or as an uplink symbol, respectively.

For each slot configuration provided by tdd-UL-DL-ConfigurationDedicated, a reference SCS configuration is the reference SCS configuration $\mu_{ref}$ provided by tdd-UL-DL-ConfigurationCommon.

A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are common to each configured BWP.

A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

If a UE is not configured to monitor PDCCH for DCI format 2_0, for a set of symbols of a slot that are indicated as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE
- the UE receives PDSCH or CSI-RS in the set of symbols of the slot if the UE receives a corresponding indication by a DCI format
- the UE transmits PUSCH, PUCCH, PRACH, or SRS in the set of symbols of the slot if the UE receives a corresponding indication by a DCI format, a RAR UL grant, fallbackRAR UL grant, or successRAR For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS, or the DL PRS in the set of symbols of the slot.

For a set of symbols of a slot that are indicated to a UE as uplink by tdd-UL-DL-ConfigurationCommon, or tdd-UL-DL-ConfigurationDedicated, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon, or tdd-UL-DL-ConfigurationDedicated, the UE does not receive DL PRS in the set of symbols of the slot, if the UE is not provided with a measurement gap.

For a set of symbols of a slot that are indicated to a UE as downlink by tdd-UL-DL-ConfigurationCommon, or tdd-UL-DL-ConfigurationDedicated, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in ServingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-ConfigurationDedicated, when provided to the UE.

11.1.1 UE Procedure for Determining Slot Format

This clause applies for a serving cell that is included in a set of serving cells configured to a UE by slotFormatCombToAddModList and slotFormatCombToReleaseList, availableRB-SetsToAddModList and availableRB-SetsToRelease, switchTriggerToAddModList and switchTriggerToReleaseList, or co-DurationsPerCellToAddModList and co-DurationsPerCellToReleaseList.

If a UE is configured by higher layers with parameter SlotFormatIndicator, the UE is provided an SFI-RNTI by sfi-RNTI and with a payload size of DCI format 2_0 by dci-PayloadSize.

The UE is also provided in one or more serving cells with a configuration for a search space set s and a corresponding CORESET p for monitoring $M_{p,s}^{(L_{SFI})}$ PDCCH candidates for DCI format 2_0 with a CCE aggregation level of $L_{SFI}$ CCEs as described in clause 10.1. The $M_{p,s}^{(L_{SFI})}$ PDCCH candidates are the first $M_{p,s}^{(L_{SFI})}$ PDCCH candidates for CCE aggregation level $L_{SFI}$ for search space set s in CORESET p. For each serving cell in the set of serving cells, the UE can be provided:

an identity of the serving cell by servingCellId a location of a SFI-index field in DCI format 2_0 by positionInDCI a set of slot format combinations by slotFormatCombinations, where each slot format combination in the set of slot format combinations includes one or more slot formats indicated by a respective slotFormats for the slot format combination, and a mapping for the slot format combination provided by slotFormats to a corresponding SFI-index field value in DCI format 2_0 provided by slotFormatCombinationId A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes $\max\{\lceil\log_2(\text{maxSFIindex}+1)\rceil,1\}$ bits where maxSFIindex is the maximum value of the values provided by corresponding slotFormatCombinationId. A slot format is identified by a corresponding format index as provided in Table 11.1.1-1 where 'D' denotes a downlink symbol, 'U' denotes an uplink symbol, and 'F' denotes a flexible symbol.

For unpaired spectrum operation for a UE on a serving cell, the UE is provided by subcarrierSpacing a reference SCS configuration $\mu_{SFI}$ for each slot format in a combination of slot formats indicated by an SFI-index field value in DCI format 2_0. The UE expects that for a reference SCS configuration $\mu_{SFI}$ and for an active DL BWP or an active UL BWP with SCS configuration $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu-\mu_{SFI})}$ consecutive downlink or flexible or uplink symbols for the SCS configuration $\mu$.

For a set of symbols of a slot, a UE does not expect to detect a DCI format 2_0 with an SFI-index field value indicating the set of symbols of the slot as uplink and to detect a DCI format indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfig Common, as described in clause 4.1, the UE does not expect to detect a DCI format 2_0 with an SFI-index field value indicating the set of symbols of the slot as uplink.

For a set of symbols of a slot corresponding to a valid PRACH occasion and $N_{gap}$ symbols before the valid PRACH occasion, as described in clause 8.1, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255 if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible.

if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink if the UE is configured by higher layers to transmit SRS in the set of symbols of the slot, the UE transmits the SRS only in a subset of symbols from the set of symbols of the slot indicated as uplink symbols by an SFI-index field value in DCI format 2_0 a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in clause 10.2 a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

For operation with shared spectrum channel access, if a UE is configured by higher layers to receive a CSI-RS and the UE is provided CO-DurationsPerCell, for a set of symbols of a slot that are indicated as downlink or flexible by tdd-UL-DL-ConfigurationCommon or tdd-UL-DL-ConfigurationDedicated, or when tdd-UL-DL-ConfigurationCommon and tdd-UL-DL-ConfigurationDedicated are not provided, the UE cancels the CSI-RS reception in the set of symbols of the slot that are not within the remaining channel occupancy duration.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot the UE receives PDSCH or CSI-RS in the set of symbols of the slot if the UE receives a corresponding indication by a DCI format the UE transmits PUSCH, PUCCH, PRACH, or SRS in the set of symbols of the slot if the UE receives a corresponding indication by a DCI format, a RAR UL grant, fallbackRAR UL grant, or successRAR the UE receives PDCCH as described in clause 10.1 if the UE is configured by higher layers to receive PDSCH in the set of symbols of the slot, the UE does not receive the PDSCH in the set of symbols of the slot if the UE is configured by higher layers to receive CSI-RS in the set of symbols of the slot, the UE does not receive the CSI-RS in the set of symbols of the slot, except when UE is provided CO-DurationsPerCell and the set of symbols of the slot are within the remaining channel occupancy duration.

if the UE is configured by higher layers to receive DL PRS in the set of symbols of the slot, the UE receives the DL PRS if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

For unpaired spectrum operation for a UE on a cell in a frequency band of FR1, and when the scheduling restrictions due to RRM measurements [10, TS 38.133] are not applicable, if the UE detects a DCI format indicating to the UE to transmit in a set of symbols, the UE is not required to perform RRM measurements [10, TS 38.133] based on a SS/PBCH block or CSI-RS reception on a different cell in the frequency band if the SS/PBCH block or CSI-RS reception includes at least one symbol from the set of symbols.

* * * Quotation End * * *

Duplexing enhancement has been discussed in 3GPP to enable more frequent UL so as to improve latency and UL coverage. UL transmission and DL transmission could occur on a same symbol for unpaired spectrum (e.g. TDD). More detail regarding duplexing could be found from below quotation from [3] RP-212707, "Draft SID on Evolution of NR Duplex Operation":

* * * Quotation Start * * *

In this study, the followings are assumed:
  Duplex enhancement at the gNB side
  Half duplex operation at the UE side
  No restriction on frequency ranges The detailed objectives are as follows:
  Identify applicable and relevant deployment scenarios and use cases (RAN1).
  Develop evaluation methodology for duplex enhancement (RAN1).
  Study the subband non-overlapping full duplex and potential enhancements on dynamic/flexible TDD.

* * * Quotation End * * *

Issues and Solutions:

Enhancement on duplexing scheme could have impact on how a User Equipment (UE) handles Downlink (DL) reception or Uplink (UL) transmission. For example, on a conventional DL symbol (e.g., without duplexing enhancement), a UE would not perform UL transmission on such symbol, e.g., cancel a configured UL transmission on the symbol or does not expect a Downlink Control Information (DCI) schedule UL transmission on the symbol (a Network (NW) shall not perform such scheduling and/or UE consider such scheduling as an error case). Similar restriction on DL reception could be applied for a conventional UL symbol. The indicated transmission direction applies to all/whole frequency resources of a bandwidth part/serving cell. However, when one symbol could support more than one transmission direction, e.g., for both DL and UL, under duplexing enhancements such restriction may not hold any longer. For example, a UE may be able to perform UL transmission on a symbol indicated as DL. The currently available three types of transmission direction (DL, UL, Flexible) may suffer some limitation to reveal proper/desired UE behavior.

The use of "(s)" with a word, term, or phrase herein means that "one or more" of that word, term, or phrase are contemplated and possible for various embodiments and aspects of the present invention.

A concept of this invention is to introduce or define a new type of transmission direction. The new transmission direction is in addition to DL, UL, Flexible. The new transmission direction could be "N", "Neutral", "B", "Bi-direction", "Bypass", "X", "Special", "T", "Transparent", "Free", "Full duplex", "Flexible duplex". The new transmission direction could be indicated by all or some of signal(s) indicating Slot Form Indicator (SFI), e.g., one or more of Radio Resource Control (RRC) signals, common RRC signals, dedicated RRC signals, DCI, DCI format 2_0, DCI scheduling a transmission/reception, RRC signals configuring a transmission/reception, etc. A UE handles a transmission/reception on a symbol indicated as the new transmission direction differently from handling transmission/reception on a symbol indicated as DL/UL/Flexible. A UE does not cancel a reception due to slot format for a symbol indicated as the new transmission direction. A UE does not cancel a reception due to overlapping with UL signal for a symbol indicated as the new transmission direction. For example, the UL signal is a (configured) preamble. A UE does not cancel a transmission due to slot format for a symbol indicated as the new transmission direction. A UE does not cancel a transmission due to overlapping with a DL signal for a symbol indicated as the new transmission direction. For example, the DL signal could be Synchronization Signal Block (SSB) or Remaining Minimum System Information (RMSI) or System Information Block #1 (SIB1) or search space associated with Control Resource Set (CORESET) 0. Both UL transmission and DL reception are allowed on a symbol indicated as the new transmission direction. UL transmission and DL reception are performed (simultaneously) on a symbol indicated as the new transmission direction. The new transmission direction could override a DL symbol. The new transmission direction could override a UL symbol. The new transmission direction could override a flexible symbol. The new transmission direction could not override a DL symbol. The new transmission direction could not override a UL symbol. The new transmission direction could not override a flexible symbol. A DL symbol could override the new transmission direction. A UL symbol could override the new transmission direction. A flexible symbol could override the new transmission direction. A flexible symbol could override the new transmission direction. A UL symbol could override the new transmission direction. A flexible symbol could override the new transmission direction.

A UE performs one or more of the following actions for a symbol indicated as the new transmission direction (in the following noted as neutral symbol):

If the UE is additionally provided tdd-UL-DL-ConfigurationDedicated, the parameter tdd-UL-DL-ConfigurationDedicated overrides flexible and/or neutral symbols per slot over the number of slots as provided by tdd-UL-DL-ConfigurationCommon.

For each slot having a corresponding index provided by slotIndex, the UE applies a format provided by corresponding symbols. The UE receives tdd-UL-DL-ConfigurationDedicated to indicate as neutral symbol that tdd-UL-DL-ConfigurationCommon indicates as a downlink or as an uplink symbol, respectively.

A slot configuration period and a number of downlink symbols, uplink symbols, flexible symbols, and neutral symbols, in each slot of the slot configuration period are determined from tdd-UL-DL-ConfigurationCommon and tdd-UL-DL-ConfigurationDedicated and are common to each configured BWP.

If a UE is not configured to monitor Physical Downlink Control Channel (PDCCH) for DCI format 2_0, for a set of symbols of a slot that are indicated as neutral by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, the UE receives Physical Downlink Shared Channel (PDSCH) or Channel State Information Reference Signal (CSI-RS) in the set of symbols of the slot if the UE receives a corresponding indication by a DCI format.

If a UE is not configured to monitor PDCCH for DCI format 2_0, for a set of symbols of a slot that are indicated as neutral by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, the UE transmits Physical Uplink Shared Channel (PUSCH), Physical Uplink Control Channel (PUCCH), Physical Random Access Channel (PRACH), or Sounding Reference Signal (SRS) in the set of symbols of the slot if the UE receives a corresponding indication by a DCI format, a Random Access Response (RAR) UL grant, fallbackRAR UL grant, or successRAR.

For operation on a single carrier in unpaired spectrum, if a UE is configured by higher layers to receive a PDCCH, or a PDSCH, or a CSI-RS, or a DL Positioning Reference Signal (PRS) in a set of symbols of a slot, the UE receives the PDCCH, the PDSCH, the CSI-RS, or the DL PRS if the UE detects a DCI format that indicates to the UE to transmit a PUSCH, a PUCCH, a PRACH, or a SRS in at least one symbol of the set of symbols of the slot and the set of symbols is indicated as neutral; otherwise, the UE does not receive the PDCCH, or the PDSCH, or the CSI-RS, or the DL PRS in the set of symbols of the slot.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols then: If the UE does not indicate the capability of [partialCancellation], the UE performs the transmission of the PUCCH or PUSCH or PRACH in the set of symbols if the set of symbols is indicated as neutral; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then: If the UE indicates the capability of [partialCancellation] and the symbol is indicated as neutral, the UE performs the transmission of the PUCCH or PUSCH or PRACH in symbols from the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols which is indicated as neutral then: The UE performs the transmission of SRS in symbols from the subset of symbols.

For a set of symbols of a slot that are indicated to a UE as uplink by tdd-UL-DL-ConfigurationCommon and the set of symbols of a slot that are indicated to a UE as neutral by another signal indicating SFI, e.g., tdd-UL-DL-ConfigurationDedicated, UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon and the set of symbols of a slot are not indicated to a UE as neutral by another signal indicating SFI, UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationDedicated and the set of symbols of a slot that are indicated to a UE as neutral by another signal indicating SFI, e.g., DCI format 2_0, the UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationDedicated and the set of symbols of a slot that are not indicated to a UE as neutral by another signal indicating SFI, e.g., DCI format 2_0, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon and the set of symbols of a slot that are indicated to a UE as neutral by another signal indicating SFI, e.g., tdd-UL-DL-ConfigurationDedicated or DCI format 2_0, the UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationComm and the set of symbols of a slot that are not indicated to a UE as neutral by another signal indicating SFI, e.g., tdd-UL-DL-ConfigurationDedicated or DCI format 2_0, the UE does not receive DL PRS in the set of symbols of the slot, if the UE is not provided with a measurement gap.

For a set of symbols of a slot that are indicated to a UE as uplink by tdd-UL-DL-ConfigurationComm and the set of symbols of a slot that are indicated to a UE as neutral by another signal indicating SFI, e.g., tdd-UL-DL-ConfigurationDedicated or DCI format 2_0, the UE receives DL PRS in the set of symbols of the slot, if the UE is not provided with a measurement gap.

For a set of symbols of a slot that are indicated to a UE as uplink by tdd-UL-DL-ConfigurationDedicated and the set of symbols of a slot that are not indicated to a UE as neutral by another signal indicating SFI, e.g., DCI format 2_0, the UE does not receive DL PRS in the set of symbols of the slot, if the UE is not provided with a measurement gap.

For a set of symbols of a slot that are indicated to a UE as uplink by tdd-UL-DL-ConfigurationDedicated and the set of symbols of a slot that are indicated to a UE as neutral by another signal indicating SFI, e.g., DCI format 2_0, the UE receives DL PRS in the set of symbols of the slot, if the UE is not provided with a measurement gap.

For a set of symbols of a slot that are indicated to a UE as downlink by tdd-UL-DL-ConfigurationCommon and the set of symbols of a slot that are not indicated to a UE as neutral by another signal indicating SFI, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as downlink by tdd-UL-DL-ConfigurationCommon and the set of symbols of a slot that are indicated to a UE as neutral by another signal indicating SFI, the UE transmits PUSCH, PUCCH, PRACH, or SRS when the PUSCH, PUCCH, PRACH, or SRS overlaps, even partially, with the set of symbols of the slot.

For a set of symbols of a slot that are indicated to a UE as downlink by tdd-UL-DL-ConfigurationDedicated and the set of symbols of a slot that are not indicated to a UE as neutral by another signal indicating SFI, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as downlink by tdd-UL-DL-ConfigurationDedicated and the set of symbols of a slot that are indicated to a UE as neutral by another signal indicating SFI, the UE transmits PUSCH, PUCCH, PRACH, or SRS when the PUSCH, PUCCH, PRACH, or SRS overlaps, even partially, with the set of symbols of the slot.

For a set of symbols of a slot that are indicated to a UE as neutral by tdd-UL-DL-ConfigurationCommon, and tdd-UL-DL-ConfigurationDedicated if provided, the UE receives both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in ServingCellConfigCommon, for reception of Synchronization Signal/Physical Broadcast Channel (SS/PBCH) blocks and the set of symbols of a slot that are not indicated to a UE as neutral, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-ConfigurationDedicated, when provided to the UE.

For operation on a single carrier in unpaired spectrum, for a set of symbols of a slot indicated to a UE by ssb-PositionsInBurst in SIB1 or ssb-PositionsInBurst in ServingCellConfigCommon, for reception of SS/PBCH blocks and the set of symbols of a slot that are indicated to a UE as neutral, the UE transmits PUSCH, PUCCH, PRACH in the slot if a transmission would overlap with any symbol from the set of symbols and/or the UE transmits SRS in the set of symbols of the slot. The set of symbols of the slot is indicated as uplink by tdd-UL-DL-ConfigurationCommon, or tdd-UL-DL-ConfigurationDedicated, when provided to the UE.

For a set of symbols of a slot corresponding to a valid PRACH occasion and $N_{gap}$ symbols before the valid PRACH occasion and the set of symbols of a slot that are not indicated to a UE as neutral, the UE does not receive PDCCH, PDSCH, or CSI-RS in the slot if a reception would overlap with any symbol from the set of symbols. The UE does not expect the set of symbols of the slot to be indicated as downlink by tdd-UL-DL-ConfigurationCommon or tdd-UL-DL-ConfigurationDedicated.

For a set of symbols of a slot corresponding to a valid PRACH occasion and $N_{gap}$ symbols before the valid PRACH occasion and the set of symbols of a slot that are indicated to a UE as neutral, the UE receives PDCCH, PDSCH, or CSI-RS in the slot if a reception would overlap with any symbol from the set of symbols. The set of symbols of the slot is indicated as downlink by tdd-UL-DL-ConfigurationCommon or tdd-UL-DL-ConfigurationDedicated.

For a set of symbols of a slot indicated to a UE by pdcch-ConfigSIB1 in Master information Block (MIB) for a CORESET for Type0-PDCCH Common Search Space (CSS) set and the set of symbols of a slot that are not indicated to a UE as neutral, the UE does not expect the set of symbols to be indicated as uplink by tdd-UL-DL-ConfigurationCommon, or tdd-UL-DL-ConfigurationDedicated.

For a set of symbols of a slot indicated to a UE by pdcch-ConfigSIB1 in MIB for a CORESET for Type0-PDCCH CSS set and the set of symbols of a slot that are indicated to a UE as neutral, the UE is indicated the set of symbols as uplink by tdd-UL-DL-ConfigurationCommon, or tdd-UL-DL-ConfigurationDedicated.

If a UE is scheduled by a DCI format to receive PDSCH over multiple slots, and if tdd-UL-DL-ConfigurationCommon indicates that, for a slot from the multiple slots, at least one symbol from a set of symbols where the UE is scheduled PDSCH reception in the slot is an uplink symbol and at least one symbol from the set of symbols of a slot that are not indicated to a UE as neutral by another signal indicating SFI, the UE does not receive the PDSCH in the slot.

If a UE is scheduled by a DCI format to receive PDSCH over multiple slots, and if tdd-UL-DL-ConfigurationCommon indicates that, for a slot from the multiple slots, at least one symbol from a set of symbols where the UE is scheduled PDSCH reception in the slot is an uplink symbol and at least one symbol from the set of symbols of a slot that are indicated to a UE as neutral by another signal indicating SFI, the UE receives the PDSCH in the slot.

If a UE is scheduled by a DCI format to receive PDSCH over multiple slots, and if tdd-UL-DL-ConfigurationDedicated, indicates that, for a slot from the multiple slots, at least one symbol from a set of symbols where the UE is scheduled PDSCH reception in the slot is an uplink symbol and the at least one symbol from the set of symbols of a slot that are not indicated to a UE as neutral by another signal indicating SFI, the UE does not receive the PDSCH in the slot.

If a UE is scheduled by a DCI format to receive PDSCH over multiple slots, and if tdd-UL-DL-ConfigurationDedicated, indicates that, for a slot from the multiple slots, at least one symbol from a set of symbols where the UE is scheduled PDSCH reception in the slot is an uplink symbol and the at least one symbol from the set of symbols of a slot that are indicated to a UE as neutral by another signal indicating SFI, the UE receives the PDSCH in the slot.

If a UE is scheduled by a DCI format to transmit PUSCH over multiple slots, and if tdd-UL-DL-ConfigurationCommon, indicates that, for a slot from the multiple slots, at least one symbol from a set of symbols where the UE is scheduled PUSCH transmission in the slot is a downlink symbol, and the at least one symbol from the set of symbols of a slot that are not indicated to a UE as neutral by another signal indicating SFI, the UE does not transmit the PUSCH in the slot.

If a UE is scheduled by a DCI format to transmit PUSCH over multiple slots, and if tdd-UL-DL-ConfigurationCommon, indicates that, for a slot from the multiple slots, at least one symbol from a set of symbols where the UE is scheduled PUSCH transmission in the slot is a downlink symbol, and the at least one symbol from the set of symbols of a slot that are indicated to a UE as neutral by another signal indicating SFI, the UE transmits the PUSCH in the slot.

If a UE is scheduled by a DCI format to transmit PUSCH over multiple slots, and if tdd-UL-DL-ConfigurationDedicated, indicates that, for a slot from the multiple slots, at least one symbol from a set of symbols where the UE is scheduled PUSCH transmission in the slot is a downlink symbol and the at least one symbol from the set of symbols of a slot that are not indicated to a UE as neutral by another signal indicating SFI, the UE does not transmit the PUSCH in the slot.

If a UE is scheduled by a DCI format to transmit PUSCH over multiple slots, and if tdd-UL-DL-ConfigurationDedicated, indicates that, for a slot from the multiple slots, at least one symbol from a set of symbols where the UE is scheduled PUSCH transmission in the slot is a downlink symbol and the at least one symbol from the set of symbols of a slot that are indicated to a UE as neutral by another signal indicating SFI, the UE transmits the PUSCH in the slot.

For a set of symbols of a slot, a UE does not expect to detect a DCI format 2_0 with an SFI-index field value indicating the set of symbols of the slot as uplink and to detect a DCI format indicating to the UE to receive PDSCH or CSI-RS in the set of symbols of the slot unless the set of symbols of a slot are indicated to a UE as neutral by another signal indicating SFI.

For a set of symbols of a slot, a UE does not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot unless the set of symbols of a slot are indicated to a UE as neutral by another signal indicating SFI.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible unless the set of symbols of a slot are indicated to a UE as neutral by another signal indicating SFI.

For a set of symbols of a slot that are indicated as downlink/uplink by tdd-UL-DL-ConfigurationCommon, or tdd-UL-DL-ConfigurationDedicated, the UE detects a DCI format 2_0 with an SFI-index field value indicating the set of symbols of the slot as neutral.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfig Common, as described in clause 4.1, the UE does not expect to detect a DCI format 2_0 with an SFI-index field value indicating the set of symbols of the slot as uplink unless the set of symbols of a slot are indicated to a UE as neutral by another signal indicating SFI.

For a set of symbols of a slot corresponding to a valid PRACH occasion and $N_{gap}$ symbols before the valid PRACH occasion, as described in clause 8.1, the UE does not expect to detect a DCI format 2_0 with an SFI-index field value indicating the set of symbols of the slot as downlink unless the set of symbols of a slot are indicated to a UE as neutral by another signal indicating SFI.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink unless the set of symbols of a slot are indicated to a UE as neutral by another signal indicating SFI.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols unless the set of symbols of a slot are indicated to a UE as neutral by another signal indicating SFI.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if one or more symbols from the set of symbols are symbols in a CORESET configured to the UE for PDCCH monitoring, the UE receives PDCCH in the CORESET if an SFI-index field value in DCI format 2_0 indicates that the one or more symbols are uplink and/or flexible and/or neutral.

For a set of symbols of a slot indicated to a UE as DL or UL or flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as neutral and the UE detects a DCI format indicating to the UE to receive PDSCH or CSI-RS in the set of symbols of the slot, the UE receives PDSCH or CSI-RS in the set of symbols of the slot.

For a set of symbols of a slot indicated to a UE as DL or UL or flexible or neutral by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as neutral and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot.

For a set of symbols of a slot indicated to a UE as DL or UL or flexible or neutral by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as neutral, and the UE detects a DCI format indicating to the UE to receive PDSCH or CSI-RS, and the UE detects a DCI format, a RAR UL, fallbackRAR UL grant, or successRAR grant indicating to the UE to transmit PUSCH, PUCCH, PRACH, or SRS in the set of symbols of the slot, the UE transmits and receives (simultaneously) in the set of symbols of the slot.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to receive DL PRS in the set of symbols of the slot, the UE receives the DL PRS in the set of symbols of the slot if an SFI-index field value in DCI format 2_0 indicates the set of symbols of the slot as downlink or flexible or neutral.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink or neutral.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit SRS in the set of symbols of the slot, the UE transmits the SRS only in a subset of symbols from the set of symbols of the slot indicated as uplink or neutral symbols by an SFI-index field value in DCI format 2_0.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detects an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detect an SFI-index field value in DCI format 2_0 indicating the set of symbols of the slot as downlink or flexible or neutral if the set of symbols of the slot includes symbols corresponding to any repetition of a PUSCH transmission activated by an UL Type 2 grant PDCCH.

For a set of symbols of a slot indicated to a UE as DL or UL or flexible or neutral by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detects an SFI-index field value in DCI format 2_0 indicating the set of symbols of the slot as uplink or neutral and also detects a DCI format indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot unless the at least one symbol is indicated as neutral.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as neutral, and/or the UE detects a DCI format indicating to the UE to transmit PUSCH, PUCCH, SRS, or PRACH in at least one symbol in the set of the symbols, the UE performs the CSI-RS reception in the set of symbols of the slot or cancels the PDSCH reception in the slot.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot unless the at least one symbol is indicated as neutral.

If a UE is configured by higher layers to receive a DL PRS in a set of symbols of a slot and the UE detects a DCI format 2_0 with a slot format value other than 255 that indicates a slot format with a subset of symbols from the set of symbols as neutral, or the UE detects a DCI format indicating to the UE to transmit PUSCH, PUCCH, SRS, or PRACH in at least one symbol in the set of the symbols, the UE performs the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: The UE does not expect to cancel the transmission of SRS in symbols from the subset of symbols that occur within T_(proc,2) relative to a last symbol of a CORESET where the UE detects the DCI format unless the at least one symbol is indicated as neutral. The UE cancels the SRS transmission in remaining symbols from the subset of symbols unless the at least one symbol is indicated as neutral.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as neutral, or the UE detects a DCI format indicating to the UE to receive CSI-RS or PDSCH in a subset of symbols from the set of symbols, then: the UE performs the transmission of SRS in symbols from the subset of symbols.

A UE assumes that neutral symbols in a CORESET configured to the UE for PDCCH monitoring are downlink symbols if the UE detects an SFI-index field value in DCI format 2_0 indicating the set of symbols of the slot as flexible or uplink and/or the UE detects a DCI format indicating to the UE to transmit SRS, PUSCH, PUCCH, or PRACH in the set of symbols.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDSCH or CSI-RS in the set of symbols of the slot if the UE receives a corresponding indication by a DCI format.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE transmits PUSCH, PUCCH, PRACH, or SRS in the set of symbols of the slot if the UE receives a corresponding indication by a DCI format, a RAR UL grant, fallbackRAR UL grant, or successRAR.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDCCH as described in clause 10.1.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive PDSCH in the set of symbols of the slot, the UE receives the PDSCH in the set of symbols of the slot.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive DL PRS in the set of symbols of the slot, the UE receives the DL PRS.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is not provided enableConfiguredUL, then: the UE performs the transmission of SRS in the set of symbols.

For a set of symbols of a slot that are indicated as neutral by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

In one embodiment, a UE receives slot format information from a base station, wherein the slot format information corresponds to four transmission directions or four symbol types. A first transmission direction/symbol type is DL. A second transmission direction/symbol type is UL. A third transmission direction/symbol type is Flexible. A fourth transmission direction/symbol type is one of "N", "Neutral", "B", "Bi-direction", "Bypass", "X", "Special", "T", "Transparent", "Free", "Full duplex", "Flexible duplex". A UE is allowed to perform transmission and reception on symbols indicated as the fourth transmission direction/symbol type. A UE performs transmission and reception (simultaneously) on symbols indicated as fourth transmission direction/symbol type. A UE performs different handling on transmission/reception on symbol indicated as the fourth transmission direction/symbol type from handling on transmission/reception on symbol indicated as flexible. A UE performs different handling on transmission/reception on symbol indicated as the fourth transmission direction/symbol type from handling on transmission/reception on symbol indicated as DL. A UE performs different handling on transmission/reception on symbol indicated as the fourth transmission direction/symbol type from handling on transmission/reception on symbol indicated as UL. The fourth symbol type can override any of the three symbol types, e.g., DL, UL, Flexible. The fourth symbol type indicated by DCI format 2_0 can override any of the three symbol types, e.g., DL, UL, Flexible, configured by RRC signal. DL, UL, or Flexible cannot override the fourth symbol type. DL, UL, or Flexible indicated by DCI format 2_0 cannot override the fourth symbol type indicated by RRC.

In another embodiment, a base station transmits slot format information to a UE, wherein the slot format information corresponds to four transmission directions or four symbol types. A first transmission direction/symbol type is DL. A second transmission direction/symbol type is UL. A third transmission direction/symbol type is Flexible. A fourth transmission direction/symbol type is one of "N", "Neutral", "B", "Bi-direction", "Bypass", "X", "Special", "T", "Transparent", "Free", "Full duplex", "Flexible duplex". A base station is allowed to perform transmission and reception on symbols indicated as the fourth transmission direction/symbol type. A base station performs transmission and reception (simultaneously) on symbols indicated as fourth transmission direction/symbol type. A base station performs different handling on transmission/reception on symbol indicated as the fourth transmission direction/symbol type from handling on transmission/reception on symbol indicated as flexible. A base station performs different handling on transmission/reception on symbol indicated as the fourth transmission direction/symbol type from handling on transmission/reception on symbol indicated as DL. A base station performs different handling on transmission/reception on symbol indicated as the fourth transmission direction/symbol type from handling on transmission/reception on symbol indicated as UL. The fourth symbol type can override any of the three symbol types, e.g., DL, UL, Flexible. The fourth symbol type indicated by DCI format 2_0 can override any of the three symbol types, e.g., DL, UL, Flexible, configured by RRC signal. DL, UL, or Flexible cannot override the fourth symbol type. DL, UL, or Flexible indicated by DCI format 2_0 cannot override the fourth symbol type indicated by RRC.

A collision handling rule (or a first/old collision handling rule a first action related to collision handling) could be one or more of the following (e.g., the following refers to a behavior "apply collision handling rule" or "collision rule is enabled" as described above/throughout the invention herein):

If the UE is additionally provided tdd-UL-DL-ConfigurationDedicated, the parameter tdd-UL-DL-ConfigurationDedicated overrides only flexible symbols per slot over the number of slots as provided by tdd-UL-DL-ConfigurationCommon.

For each slot having a corresponding index provided by slotIndex, the UE applies a format provided by corresponding symbols. The UE does not expect tdd-UL- DL-ConfigurationDedicated to indicate as uplink or as downlink a symbol that tdd-UL-DL-Configuration-Common indicates as a downlink or as an uplink symbol, respectively.

A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are common to each configured BWP.

A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

If a UE is not configured to monitor PDCCH for DCI format 2_0, for a set of symbols of a slot that are indicated as flexible by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, the UE receives PDSCH or CSI-RS in the set of symbols of the slot if the UE receives a corresponding indication by a DCI format.

If a UE is not configured to monitor PDCCH for DCI format 2_0, for a set of symbols of a slot that are indicated as flexible by tdd-UL-DL-Configuration-Common and tdd-UL-DL-ConfigurationDedicated if provided, or when tdd-UL-DL-ConfigurationCommon and tdd-UL-DL-ConfigurationDedicated are not provided to the UE, the UE transmits PUSCH, PUCCH, PRACH, or SRS in the set of symbols of the slot if the UE receives a corresponding indication by a DCI format, a RAR UL grant, fallbackRAR UL grant, or successRAR.

For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE does not detect a DCI format that indicates to the UE to transmit a PUSCH, a PUCCH, a PRACH, or a SRS in at least one symbol of the set of symbols of the slot; otherwise, the UE does not receive the PDCCH, or the PDSCH, or the CSI-RS, or the DL PRS in the set of symbols of the slot.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols then: If the UE does not indicate the capability of [partialCancellation], the UE does not expect to cancel the transmission of the PUCCH or PUSCH or PRACH in the set of symbols if the first symbol in the set occurs within T_(proc,2) relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then: If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols then: The UE does not expect to cancel the transmission of SRS in symbols from the subset of symbols that occur within T_(proc,2) relative to a last symbol of a CORESET where the UE detects the DCI format. The UE cancels the SRS transmission in remaining symbols from the subset of symbols.

For a set of symbols of a slot that are indicated to a UE as uplink by tdd-UL-DL-ConfigurationCommon the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationDedicated, the UE does not receive PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon, the UE does not receive DL PRS in the set of symbols of the slot, if the UE is not provided with a measurement gap.

For a set of symbols of a slot that are indicated to a UE as uplink by tdd-UL-DL-ConfigurationDedicated, the UE does not receive DL PRS in the set of symbols of the slot, if the UE is not provided with a measurement gap.

For a set of symbols of a slot that are indicated to a UE as downlink by tdd-UL-DL-ConfigurationCommon, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as downlink by tdd-UL-DL-ConfigurationDedicated, the UE does not transmit PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE does not expect to receive both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in ServingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by tdd-UL-DL-ConfigurationCommon, or tdd-UL-DL-ConfigurationDedicated, when provided to the UE.

For a set of symbols of a slot corresponding to a valid PRACH occasion and $N_{gap}$ symbols before the valid PRACH occasion, as described in clause 8.1, the UE does not receive PDCCH, PDSCH, or CSI-RS in the slot if a reception would overlap with any symbol from the set of symbols. The UE does not expect the set of symbols of the slot to be indicated as downlink by tdd-UL-DL-ConfigurationCommon or tdd-UL-DL-ConfigurationDedicated.

For a set of symbols of a slot indicated to a UE by pdcch-ConfigSIB1 in MIB for a CORESET for Type0-PDCCH CSS set, the UE does not expect the set of symbols to be indicated as uplink by tdd-UL-DL-ConfigurationCommon, or tdd-UL-DL-ConfigurationDedicated.

If a UE is scheduled by a DCI format to receive PDSCH over multiple slots, and if tdd-UL-DL-ConfigurationCommon indicates that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format to receive PDSCH over multiple slots, and if tdd-UL-DL-ConfigurationDedicated, indicates that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format to transmit PUSCH over multiple slots, and if tdd-UL-DL-ConfigurationCommon, indicates that, for a slot from the multiple slots, at least one symbol from a set of symbols where the UE is scheduled PUSCH transmission in the slot is a downlink symbol, the UE does not transmit the PUSCH in the slot.

If a UE is scheduled by a DCI format to transmit PUSCH over multiple slots, and if tdd-UL-DL-ConfigurationDedicated, indicates that, for a slot from the multiple slots, at least one symbol from a set of symbols where the UE is scheduled PUSCH transmission in the slot is a downlink symbol, the UE does not transmit the PUSCH in the slot.

For a set of symbols of a slot, a UE does not expect to detect a DCI format 2_0 with an SFI-index field value indicating the set of symbols of the slot as uplink and to detect a DCI format indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated as downlink/uplink by tdd-UL-DL-ConfigurationCommon, or tdd-UL-DL-ConfigurationDedicated, the UE does not expect to detect a DCI format 2_0 with an SFI-index field value indicating the set of symbols of the slot as uplink/downlink, respectively, or as flexible.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfig Common, as described in clause 4.1, the UE does not expect to detect a DCI format 2_0 with an SFI-index field value indicating the set of symbols of the slot as uplink.

For a set of symbols of a slot corresponding to a valid PRACH occasion and $N_{gap}$ symbols before the valid PRACH occasion, as described in clause 8.1, the UE does not expect to detect a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE does not expect to detect a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL, fallbackRAR UL grant, or successRAR grant indicating to the UE to transmit PUSCH, PUCCH, PRACH, or SRS in the set of symbols of the slot, the UE does not transmit or receive in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit SRS in the set of symbols of the slot, the UE transmits the SRS only in a subset of symbols from the set of symbols of the slot indicated as uplink symbols by an SFI-index field value in DCI format 2_0.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE cancels the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: If the UE does not indicate the capability of [partialCancellation], the UE does not expect to cancel the transmission of the PUCCH or PUSCH or PRACH in the set of symbols if the first symbol in the set occurs within $T_{proc,2}$ relative to a last symbol of a CORESET where the UE detects the DCI format; otherwise, the UE cancels the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: If the UE indicates the capability of [partialCancellation], the UE does not expect to cancel the transmission of the PUCCH or PUSCH or PRACH in symbols from the set of symbols that occur within $T_{proc,2}$ relative to a last symbol of a CORESET where the UE detects the DCI format. The UE cancels the PUCCH, or the PUSCH, or an actual repetition of the PUSCH [6, TS 38.214], determined from clauses 9 and 9.2.5 or clause 6.1 of [6, TS 38.214], or the PRACH transmission in remaining symbols from the set of symbols.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: The UE does not expect to cancel the transmission of SRS in symbols from the subset of symbols that occur within T_(proc,2) relative to a last symbol of a CORE-SET where the UE detects the DCI format. The UE cancels the SRS transmission in remaining symbols from the subset of symbols.

A UE assumes that flexible symbols in a CORESET configured to the UE for PDCCH monitoring are downlink symbols if the UE does not detect an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDSCH or CSI-RS in the set of symbols of the slot if the UE receives a corresponding indication by a DCI format.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE transmits PUSCH, PUCCH, PRACH, or SRS in the set of symbols of the slot if the UE receives a corresponding indication by a DCI format, a RAR UL grant, fallbackRAR UL grant, or successRAR.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDCCH as described in clause 10.1.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive PDSCH in the set of symbols of the slot, the UE does not receive the PDSCH in the set of symbols of the slot.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive DL PRS in the set of symbols of the slot, the UE receives the DL PRS.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is not provided enableConfiguredUL, then: the UE does not expect to cancel the transmission of SRS in symbols from the set of symbols that occur within T_(proc, 2) relative to a last symbol of a CORESET where the UE is configured to monitor PDCCH for DCI format 2_0. The UE cancels the SRS transmission in remaining symbols from the set of symbols.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

An exception/exemption of collision handling rule (or a new/second collision handling rule or a second action related to collision handling) could be one or more of the following (e.g., the following refers to a behavior "not apply collision handling rule" or "collision rule is disabled" as described above/throughout the invention herein):

If the UE is additionally provided tdd-UL-DL-ConfigurationDedicated, the parameter tdd-UL-DL-ConfigurationDedicated overrides DL symbols per slot over the number of slots as provided by tdd-UL-DL-ConfigurationCommon.

If the UE is additionally provided tdd-UL-DL-ConfigurationDedicated, the parameter tdd-UL-DL-ConfigurationDedicated overrides UL symbols per slot over the number of slots as provided by tdd-UL-DL-ConfigurationCommon.

For each slot having a corresponding index provided by slotIndex, the UE applies a format provided by corresponding symbols. The UE receives tdd-UL-DL-ConfigurationDedicated to indicate as uplink symbol that tdd-UL-DL-ConfigurationCommon indicates as a downlink symbol.

For each slot having a corresponding index provided by slotIndex, the UE applies a format provided by corresponding symbols. The UE receives tdd-UL-DL-ConfigurationDedicated to indicate as downlink symbol that tdd-UL-DL-ConfigurationCommon indicates as a uplink symbol.

A slot configuration period and a number of downlink symbols, uplink symbols, and flexible symbols in each slot of the slot configuration period are determined from tdd-UL-DL-ConfigurationCommon and tdd-UL-DL-ConfigurationDedicated and are different to different configured BWPs (i.e., each BWP has its own slot configuration).

A UE considers symbols in a slot indicated as uplink by tdd-UL-DL-ConfigurationCommon, or tdd-UL-DL-ConfigurationDedicated to be available for receptions.

A UE considers symbols in a slot indicated as downlink by tdd-UL-DL-ConfigurationCommon, or by tdd-UL-DL-ConfigurationDedicated to be available for transmissions.

If a UE is not configured to monitor PDCCH for DCI format 2_0, for a set of symbols of a slot that are indicated as uplink by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, the UE receives PDSCH or CSI-RS in the set of symbols of the slot if the UE receives a corresponding indication by a DCI format.

If a UE is not configured to monitor PDCCH for DCI format 2_0, for a set of symbols of a slot that are indicated as downlink by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, the UE transmits PUSCH, PUCCH, PRACH, or SRS in the set of symbols of the slot if the UE receives a corresponding indication by a DCI format, a RAR UL grant, fallbackRAR UL grant, or successRAR.

For operation on a single carrier in unpaired spectrum, if a UE is configured by higher layers to receive a PDCCH, or a PDSCH, or a CSI-RS, or a DL PRS in a set of symbols of a slot, the UE receives the PDCCH, the PDSCH, the CSI-RS, or the DL PRS if the UE detects a DCI format that indicates to the UE to transmit a PUSCH, a PUCCH, a PRACH, or a SRS in at least one symbol of the set of symbols of the slot.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols then: If the UE does not indicate the capability of [partialCancellation], the UE transmits the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols, then: If the UE indicates the capability of [partialCancellation], the UE transmits the PUCCH, or the PUSCH, or an actual repetition of the PUSCH [6, TS38.214], determined from clauses 9 and 9.2.5 or clause 6.1 of [6, TS38.214], or the PRACH transmission in the set of symbols.

For operation on a single carrier in unpaired spectrum, if a UE is configured by higher layers to transmit SRS, or PUCCH, or PUSCH, or PRACH in a set of symbols of a slot and the UE detects a DCI format indicating to the UE to receive CSI-RS or PDSCH in a subset of symbols from the set of symbols then: The UE transmit SRS in the subset of symbols.

For a set of symbols of a slot that are indicated to a UE as uplink by tdd-UL-DL-ConfigurationCommon the UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationDedicated, the UE receives PDCCH, PDSCH, or CSI-RS when the PDCCH, PDSCH, or CSI-RS overlaps, even partially, with the set of symbols of the slot.

For a set of symbols of a slot that are indicated to a UE as uplink by tdd-UL-DL-ConfigurationCommon, the UE receives DL PRS in the set of symbols of the slot, if the UE is not provided with a measurement gap.

For a set of symbols of a slot that are indicated to a UE as uplink by tdd-UL-DL-ConfigurationDedicated, the UE receives DL PRS in the set of symbols of the slot, if the UE is not provided with a measurement gap.

For a set of symbols of a slot that are indicated to a UE as downlink by tdd-UL-DL-ConfigurationCommon, the UE transmits PUSCH, PUCCH, PRACH, or SRS when the PUSCH, PUCCH, PRACH, or SRS overlaps, even partially, with the set of symbols of the slot.

For a set of symbols of a slot that are indicated to a UE as downlink by tdd-UL-DL-ConfigurationDedicated, the UE transmits PUSCH, PUCCH, PRACH, or SRS when the PUSCH, PUCCH, PRACH, or SRS overlaps, even partially, with the set of symbols of the slot.

For a set of symbols of a slot that are indicated to a UE as flexible by tdd-UL-DL-ConfigurationCommon, and tdd-UL-DL-ConfigurationDedicated if provided, the UE receives both dedicated higher layer parameters configuring transmission from the UE in the set of symbols of the slot and dedicated higher layer parameters configuring reception by the UE in the set of symbols of the slot.

For operation on a single carrier in unpaired spectrum, for a set of symbols of a slot indicated to a UE by ssb-PositionsInBurst in SIB1 or ssb-PositionsInBurst in ServingCellConfigCommon, for reception of SS/PBCH blocks, the UE transmits PUSCH, PUCCH, PRACH in the slot if a transmission would overlap with any symbol from the set of symbols and the UE transmits SRS in the set of symbols of the slot. The set of symbols of the slot is indicated as uplink by tdd-UL-DL-ConfigurationCommon, or tdd-UL-DL-ConfigurationDedicated, when provided to the UE.

For a set of symbols of a slot corresponding to a valid PRACH occasion and $N_p$, symbols before the valid PRACH occasion, as described in clause 8.1, the UE receives PDCCH, PDSCH, or CSI-RS in the slot if a reception would overlap with any symbol from the set of symbols. The set of symbols of the slot is indicated as downlink by tdd-UL-DL-ConfigurationCommon or tdd-UL-DL-ConfigurationDedicated.

For a set of symbols of a slot indicated to a UE by pdcch-ConfigSIB1 in MIB for a CORESET for Type0-PDCCH CSS set, the set of symbols is indicated as uplink by tdd-UL-DL-ConfigurationCommon, or tdd-UL-DL-ConfigurationDedicated.

If a UE is scheduled by a DCI format to receive PDSCH over multiple slots, and if tdd-UL-DL-Configuration-Common indicates that, for a slot from the multiple slots, at least one symbol from a set of symbols where the UE is scheduled PDSCH reception in the slot is an uplink symbol, the UE receives the PDSCH in the slot.

If a UE is scheduled by a DCI format to receive PDSCH over multiple slots, and if tdd-UL-DL-Configuration-Dedicated, indicates that, for a slot from the multiple slots, at least one symbol from a set of symbols where the UE is scheduled PDSCH reception in the slot is an uplink symbol, the UE receives the PDSCH in the slot.

If a UE is scheduled by a DCI format to transmit PUSCH over multiple slots, and if tdd-UL-DL-Configuration-Common, indicates that, for a slot from the multiple slots, at least one symbol from a set of symbols where the UE is scheduled PUSCH transmission in the slot is a downlink symbol, the UE transmits the PUSCH in the slot.

If a UE is scheduled by a DCI format to transmit PUSCH over multiple slots, and if tdd-UL-DL-Configuration-Dedicated, indicates that, for a slot from the multiple slots, at least one symbol from a set of symbols where the UE is scheduled PUSCH transmission in the slot is a downlink symbol, the UE transmits the PUSCH in the slot.

For a set of symbols of a slot, a UE detects a DCI format 2_0 with an SFI-index field value indicating the set of symbols of the slot as uplink and detects a DCI format indicating to the UE to receive PDSCH or CSI-RS in the set of symbols of the slot.

For a set of symbols of a slot, a UE detects a DCI format 2_0 with an SFI-index field value indicating the set of symbols in the slot as downlink and detects a DCI format, a RAR UL grant, fallbackRAR UL grant, or successRAR indicating to the UE to transmit PUSCH, PUCCH, PRACH, or SRS in the set of symbols of the slot.

For a set of symbols of a slot that are indicated as downlink by tdd-UL-DL-ConfigurationCommon, the UE does not expect to detect a DCI format 2_0 with an SFI-index field value indicating the set of symbols of the slot as uplink, respectively, or as flexible.

For a set of symbols of a slot that are indicated as downlink by tdd-UL-DL-ConfigurationDedicated, the UE does not expect to detect a DCI format 2_0 with an SFI-index field value indicating the set of symbols of the slot as uplink, respectively, or as flexible.

For a set of symbols of a slot that are indicated as uplink by tdd-UL-DL-ConfigurationCommon, the UE does not expect to detect a DCI format 2_0 with an SFI-index field value indicating the set of symbols of the slot as downlink, respectively, or as flexible.

For a set of symbols of a slot that are indicated as uplink by tdd-UL-DL-ConfigurationDedicated, the UE does not expect to detect a DCI format 2_0 with an SFI-index field value indicating the set of symbols of the slot as downlink, respectively, or as flexible.

For a set of symbols of a slot corresponding to SS/PBCH blocks with candidate SS/PBCH block indices corresponding to the SS/PBCH block indexes indicated to a UE by ssb-PositionsInBurst in SIB1, or by ssb-PositionsInBurst in ServingCellConfigCommon, as described in clause 4.1, the UE detects a DCI format 2_0 with an SFI-index field value indicating the set of symbols of the slot as uplink.

For a set of symbols of a slot corresponding to a valid PRACH occasion and $N_{gap}$ symbols before the valid PRACH occasion, as described in clause 8.1, the UE detects a DCI format 2_0 with an SFI-index field value indicating the set of symbols of the slot as downlink.

For a set of symbols of a slot indicated to a UE by pdcch-ConfigSIB1 in MIB for a CORESET for Type0-PDCCH CSS set, the UE detects a DCI format 2_0 with an SFI-index field value indicating the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if one or more symbols from the set of symbols are symbols in a CORESET configured to the UE for PDCCH monitoring, the UE receives PDCCH in the CORESET if an SFI-index field value in DCI format 2_0 indicates that the one or more symbols are flexible symbols.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if one or more symbols from the set of symbols are symbols in a CORESET configured to the UE for PDCCH monitoring, the UE receives PDCCH in the CORESET if an SFI-index field value in DCI format 2_0 indicates that the one or more symbols are uplink symbols.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as uplink and the UE detects a DCI format indicating to the UE to receive PDSCH or CSI-RS in the set of symbols of the slot, the UE receives PDSCH or CSI-RS in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as downlink and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if an SFI-index field value in DCI format 2_0 indicates the set of symbols of the slot as flexible, and the UE detects a DCI format indicating to the UE to receive PDSCH or CSI-RS, and the UE detects a DCI format, a RAR UL, fallbackRAR UL grant, or successRAR grant indicating to the UE to transmit PUSCH, PUCCH, PRACH, or SRS in the set of symbols of the slot, the UE transmits and receives in the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to receive DL PRS in the set of symbols of the slot, the UE receives the DL PRS in the set of symbols of the slot if an SFI-index field value in DCI format 2_0 indicates the set of symbols of the slot as uplink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit PUCCH, or PUSCH, or PRACH in the set of symbols of the slot, the UE transmits the PUCCH, or the PUSCH, or the PRACH in the slot if an SFI-index field value in DCI format 2_0 indicates the set of symbols of the slot as flexible.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit PUCCH, or PUSCH, or PRACH in the set of symbols of the slot, the UE transmits the PUCCH, or the PUSCH, or the PRACH in the slot if an SFI-index field value in DCI format 2_0 indicates the set of symbols of the slot as downlink.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit SRS in the set of symbols of the slot, the UE transmits the SRS in the set of symbols of the slot indicated as flexible symbols by an SFI-index field value in DCI format 2_0.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: if the UE is configured by higher layers to transmit SRS in the set of symbols of the slot, the UE transmits the SRS in the set of symbols of the slot indicated as downlink symbols by an SFI-index field value in DCI format 2_0.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detects an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detects an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH.

For a set of symbols of a slot indicated to a UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255: a UE detects an SFI-index field value in DCI format 2_0 indicating the set of symbols of the slot as uplink and also detect a DCI format indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 2_0 with a slot format value other than 255 that indicates a slot format with a subset of symbols from the set of symbols as uplink or flexible, or the UE detects a DCI format indicating to the UE to transmit PUSCH, PUCCH, SRS, or PRACH in at least one symbol in the set of the symbols, the UE performs the CSI-RS reception in the set of symbols of the slot or performs the PDSCH reception in the slot.

If a UE is configured by higher layers to receive a DL PRS in a set of symbols of a slot and the UE detects a DCI format 2_0 with a slot format value other than 255 that indicates a slot format with a subset of symbols from the set of symbols as uplink, or the UE detects a DCI format indicating to the UE to transmit PUSCH, PUCCH, SRS, or PRACH in at least one symbol in the set of the symbols, the UE performs the DL PRS reception in the set of symbols of the slot.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: If the UE does not indicate the capability of [partialCancellation], the UE performs the transmission of the PUCCH or PUSCH or PRACH in the set of symbols.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: If the UE indicates the capability of [partialCancellation], the UE performs transmission of the PUCCH or PUSCH or PRACH in the set of symbols.

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format indicating to the UE to receive CSI-RS or PDSCH in a subset of symbols from the set of symbols, then: The UE performs the transmission of SRS in the subset of symbols.

A UE assumes that flexible symbols in a CORESET configured to the UE for PDCCH monitoring are downlink symbols if the UE detects an SFI-index field value in DCI format 2_0 indicating the set of symbols of the slot as flexible or uplink and the UE does not detect a DCI format indicating to the UE to transmit SRS, PUSCH, PUCCH, or PRACH in the set of symbols.

For a set of symbols of a slot that are indicated as uplink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDSCH or CSI-RS in the set of symbols of the slot if the UE receives a corresponding indication by a DCI format.

For a set of symbols of a slot that are indicated as downlink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE transmits PUSCH, PUCCH, PRACH, or SRS in the set of symbols of the slot if the UE receives a corresponding indication by a DCI format, a RAR UL grant, fallbackRAR UL grant, or successRAR.

For a set of symbols of a slot that are indicated as uplink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: the UE receives PDCCH as described in clause 10.1.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive PDSCH in the set of symbols of the slot, the UE receives the PDSCH in the set of symbols of the slot.

For a set of symbols of a slot that are indicated as uplink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive PDSCH in the set of symbols of the slot, the UE receives the PDSCH in the set of symbols of the slot.

For a set of symbols of a slot that are indicated as uplink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to receive DL PRS in the set of symbols of the slot, the UE receives the DL PRS.

For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is not provided enableConfiguredUL, then: the UE performs the transmission of SRS in the set of symbols.

For a set of symbols of a slot that are indicated as uplink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is not provided enableConfiguredUL, then: the UE performs the transmission of SRS in the set of symbols.

For a set of symbols of a slot that are indicated as downlink by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot: if the UE is configured by higher layers to transmit SRS, or PUCCH, or PUSCH, or PRACH in the set of symbols of the slot and the UE is provided enableConfiguredUL, the UE can transmit the SRS, or PUCCH, or PUSCH, or PRACH, respectively.

A UE performs one or more actions/behaviors within a collision handling rule (or a first/old collision handling rule) listed above and perform one or more actions/behaviors within an exception/exemption of collision handling rule (or a new/second collision handling rule) as listed above. A UE performs one or more actions/behaviors within a collision handling rule (or a first/old collision handling rule) on a symbol indicated as flexible or DI or UL. A UE performs one or more actions/behaviors within an exception/exemption of collision handling rule (or a new/second collision handling rule) on a symbol indicated as the new transmission direction.

Collision handling rule(s) is associated with frequency resource(s). In one example, a first collision handling rule(s) is associated with a first frequency resource(s). A second collision handling rule(s) is associated with a second frequency resource(s). The UE performs corresponding action for reception/transmission within the first frequency resource(s) based on the first collision handling rule(s). The UE performs corresponding action for reception/transmission within the second frequency resource(s) based on the second collision handling rule(s). For example, a UE is indicated a first collision handling rule(s) for a first frequency resource(s) for a symbol and is indicated a second collision handling rule(s) for a second resource(s) for the symbol. The UE would perform a first collision handling rule(s) on the symbol or consider a scheduled UL transmission on the symbol an error case if/when frequency resource of configured UL transmission or scheduled UL transmission is within the first frequency resource(s). The UE would perform a second collision handling rule(s) on the symbol if/when frequency resource of configured UL transmission or scheduled UL transmission is within the second frequency resource(s). In another example, a first collision handling rule(s) direction is associated with a first frequency resource(s). The first collision handling rule(s) is not associated with a second frequency resource(s). The UE performs corresponding action for reception/transmission within the first frequency resource(s) based on the first collision handling rule(s). The UE does not perform corresponding action for reception/transmission within the second frequency resource(s) based on the first collision handling rule(s). For example, a UE is indicated a collision handling rule(s) applied for a first frequency resource(s) for a symbol. The UE is indicated a collision handling rule(s) is not applied for a second frequency resource(s) for the symbol. The UE would apply collision handling rule(s) if/when frequency resource of configured UL transmission or scheduled UL transmission is within the first frequency resource(s). The UE does not apply collision handling rule(s) if/when frequency resource of configured UL transmission or scheduled UL transmission is within the second frequency resource(s). The UE would perform a second collision handling rule(s) if/when frequency resource of configured UL transmission or scheduled UL transmission is within the second frequency resource(s).

Transmission direction(s) on a symbol(s) is associated with frequency resource(s). In one example, a first transmission direction is associated with a first frequency resource(s). A second transmission direction is associated with a second frequency resource(s). The UE performs corresponding action for reception/transmission within the first frequency resource(s) based on the first transmission direction. The UE performs corresponding action for reception/transmission within the second frequency resource(s) based on the second transmission direction. For example, a UE is indicated DL for a first frequency resource(s) for a symbol and is indicated UL for a second resource(s) for the symbol. The UE would cancel a configured UL transmission on the symbol or consider a scheduled UL transmission on the symbol an error case if/when frequency resource of configured UL transmission or scheduled UL transmission is within the first frequency resource(s). The UE would perform a configured UL transmission or a scheduled UL transmission on the symbol if/when frequency resource of configured UL transmission or scheduled UL transmission is within the second frequency resource(s). In another example, a first transmission direction is associated with a first frequency resource(s). The first transmission direction is not associated with a second frequency resource(s). The UE performs corresponding action for reception/transmission within the first frequency resource(s) based on the first transmission direction. The UE does not perform corresponding action for reception/transmission within the second frequency resource(s) based on the first transmission direction. For example, a UE is indicated DL for a first frequency resource(s) for a symbol. The UE is indicated DL is not applied for a second frequency resource(s) for the symbol. The UE would cancel a configured UL transmission on the symbol or consider a scheduled UL transmission on the symbol an error case if/when frequency resource of configured UL transmission or scheduled UL transmission is within the first frequency resource(s). The UE behaves as if DL is not indicated for the symbol for a configured UL transmission or a scheduled UL transmission if/when frequency resource of configured UL transmission or scheduled UL transmission is within the second frequency resource(s). The UE would perform a configured UL transmission or a scheduled UL transmission on the symbol if/when frequency resource of configured UL transmission or scheduled UL transmission is within the second frequency resource(s).

The first frequency resource(s) and/or the second frequency resource(s) could be resources within a bandwidth part and/or a serving cell. The first frequency resource(s) and/or the second frequency resource(s) could be all/whole resources within a bandwidth part and/or a serving cell. The UE could be indicated both the first frequency resource(s) and the second frequency resource(s). The UE could be indicated one of the first frequency resource(s) and the second frequency resource(s) and derive the other. (e.g., The UE is indicated the first frequency resource(s) and frequency resource(s) of a serving cell/bandwidth part which is not within the first frequency resource(s) is the second frequency resource(s). The UE is indicated the second frequency resource(s) and frequency resource(s) of a serving cell/bandwidth part which is not within the second frequency resource(s) is the first frequency resource(s)). The UE may expect a reception/transmission would fall in either the first frequency resource(s) or the second frequency resource(s). The base station shall configure or schedule a transmission/reception so that frequency resource of a transmission/reception would fall in either the first frequency resource(s) or the second frequency resource(s). The base station shall configure or schedule a transmission/reception so that frequency resource of a transmission/reception is not across the first frequency resource(s) and the second frequency resource(s). When frequency resource of a transmission/reception is across the first frequency resource(s) and the second frequency resource(s), the UE may take one of the actions/behaviors related to first frequency resource(s)/second frequency resource (e.g., as described above). For example, if UE cancels reception/transmission in any part of the frequency resource(s), e.g., due to frequency resource of the reception/transmission overlapping with the first frequency resource(s) or the second frequency resource(s), the UE cancels the whole reception/transmission (e.g., instead of part of it). When frequency resource of a transmission/reception is across the first frequency resource(s) and the second frequency resource(s), the UE may take separate actions/behaviors for different frequency resource(s) of the transmission/reception. (For example, cancel transmission/reception in part of the frequency resource(s) of the transmission/reception. And perform transmission/reception in other part of the frequency resource(s) of the transmission/reception).

Association between collision handling rule and frequency resource could be fixed or predefined. Association between collision handling rule and frequency resource could be indicated from a base station to a UE. The association could be configured via RRC signaling and/or indicated via Medium Access Control (MAC) Control Element (CE). The association could be indicated via DCI. The DCI could be monitored periodically. The DCI indicate the association for a certain time period. The DCI updates the association when the association is changed. The association could be indicated together with SFI. The association could be indicated separately from SFI. For example, a first SFI-RNTI and/or a first location of SFI field could be associated with a first frequency resource(s). A second SFI-RNTI and/or a second location of SFI field could be associated with a second frequency resource(s). SFI indicated by DCI associated with the first SFI-RNTI and/or the first location of SFI field could be associated with the first frequency resource(s). SFI indicated by DCI associated with the second SFI-RNTI and/or the second location of SFI field could be associated with the second frequency resource(s). A bitmap associated with a SFI could be used to indicate frequency resource associated with the SFI. A Resource Indicator Value (RIV) associated with a SFI could be used to indicate frequency resource associated with the SFI. A bandwidth part associated with a SFI could be used to indicate frequency resource associated with the SFI. A starting location(s) and a length(s) could be used to indicate the first frequency resource(s) and/or the second frequency resource(s). A starting Physical Resource Block (PRB(s)) and a bandwidth(s) could be used to indicate the first frequency resource(s) and/or the second frequency resource(s).

Association between SFI/transmission direction and frequency resource could be indicated from a base station to a UE. The association could be configured via RRC signaling and/or indicated via MAC CE. The association could be indicated via DCI. The DCI could be monitored periodically. The DCI indicate the association for a certain time period. The DCI updates the association when the association is changed. The association could be indicated together with SFI. The association could be indicated separately from SFI. For example, a first SFI-Radio Network Temporary Identifier (RNTI) and/or a first location of SFI field could be associated with a first frequency resource(s). A second SFI-RNTI and/or a second location of SFI field could be associated with a second frequency resource(s). SFI indicated by DCI associated with the first SFI-RNTI and/or the first location of SFI field could be associated with the first frequency resource(s). SFI indicated by DCI associated with the second SFI-RNTI and/or the second location of SFI field could be associated with the second frequency resource(s). A bitmap associated with a SFI could be used to indicate frequency resource associated with the SFI. A RIV (resource indicator value) associated with a SFI could be used to indicate frequency resource associated with the SFI. A bandwidth part associated with a SFI could be used to indicate frequency resource associated with the SFI. A starting location(s) and a length(s) could be used to indicate the first frequency resource(s) and/or the second frequency resource(s). A starting PRB(s) and a bandwidth(s) could be used to indicate the first frequency resource(s) and/or the second frequency resource(s).

A UE determines a first collision handling rule under a first case. The UE determines a second collision handling rule under a second case. For example, a UE determines transmission direction (or SFI) of a symbol according to different transmission direction (or SFI) indicated for the symbol based on different cases and/or situations and/or factors. For example, a UE determines whether/how to handle reception/transmission on a symbol (according to transmission direction (or SFI) of a symbol) based on different cases and/or situations and/or factors. One example of the cases/factor could be an indication from a base station. A UE determines whether/how to handle reception/transmission on a symbol according to transmission direction (or SFI) of a symbol based on an indication from a base station. The indication could enable/disable (all or some of) collision handling rules. The indication could indicate which collision handling rule(s) applies. The UE determines which collision handling rule(s) applies based on the indication. The UE determines a first collision handling rule(s) applies or a second collision handling rules applies based on the indication. The UE determines an old collision handling rule(s) applies or a new collision handling rules applies based on the indication. The indication applies to all time/frequency resources (e.g., all following resource(s) upon indicated). The indication applies to a subset of time resources (e.g., certain symbol(s) or slot(s)). The indication applies to a subset of time resources (e.g., certain PRB(s)/Bandwidth Part (BWP(s)). The indication could be an indication to enable duplexing enhancement. Another example of the cases/factor could be a type of SFI (or signaling indicating the SFI, such as common RRC signal, dedicated RRC signal, DCI format2_0, scheduling DCI, etc.). A UE determines whether/how to handle reception/transmission on a symbol (according to transmission direction (or SFI) of a symbol) based on a type of SFI. The UE determines which collision handling rule(s) applies based on type of SFI (e.g., SFI involved in the collision handling rules). The UE determines a first collision handling rule(s) applies or a second collision handling rules applies based on the type of SFI (e.g., SFI involved in the collision handling rules). The UE determines an old collision handling rule(s) applies or a new collision handling rules applies based type of SFI (e.g., SFI involved in the collision handling rules). For example, a UE applies a first/old collision handling rule(s) for SFI indicated by common RRC signal. The UE applies a second/new collision handling rule(s) for SFI indicated by dedicated RRC signal. A UE applies a collision handling rule(s) for SFI indicated by common RRC signal. The UE does not apply collision handling rule(s) for SFI indicated by dedicated RRC signal. A UE applies a first collision handling rule(s) for SFI indicated by RRC signal. The UE applies a second collision handling rule(s) for SFI indicated by scheduling DCI or DCI format 2_0. A UE applies a collision handling rule(s) for SFI indicated by RRC signal. The UE does not apply collision handling rule(s) for SFI indicated by scheduling DCI or DCI format 2_0. An example could be: A UE considers symbols in a slot indicated as downlink by tdd-UL-DL-ConfigurationCommon to be available for receptions (and not available for transmission) and considers symbols in a slot indicated as uplink by tdd-UL-DL-ConfigurationCommon, or by tdd-UL-DL-ConfigurationDedicated to be available for transmissions (and not available for reception). A UE considers symbols in a slot indicated as downlink by tdd-UL-DL-ConfigurationDedicated to be available for transmissions and considers symbols in a slot indicated as uplink by tdd-UL-DL-ConfigurationDedicated to be available for reception. Another example could be: for a set of symbols of a slot that are indicated to a UE as downlink by tdd-UL-DL-ConfigurationCommon, the UE does not transmit PUSCH, PUCCH, PRACH, or SRS when the PUSCH, PUCCH, PRACH, or SRS overlaps, even partially, with the set of symbols of the slot. For a set of symbols of a slot that are indicated to a UE as downlink by tdd-UL-DL-ConfigurationDedicated, the UE transmits PUSCH, PUCCH, PRACH, or SRS when the PUSCH, PUCCH, PRACH, or SRS overlaps, even partially, with the set of symbols of the slot. Another example of the cases/factor could be a type of reception/transmission (e.g., a DL reception, a UL transmission, a configured DL reception, a DL reception scheduled by DCI, a configured UL transmission, a UL transmission scheduled by DCI). A UE determines whether/how to handle reception/transmission on a symbol (according to transmission direction (or SFI) of a symbol) based on a type of reception/transmission. The UE determines which collision handling rule(s) applies for a reception transmission based on a type of reception/transmission. The UE determines a first collision handling rule(s) applies or a second collision handling rules applies based on a type of reception/transmission. The UE determines an old collision handling rule(s) applies or a new collision handling rules applies based a type of reception/transmission. For example, a UE applies a first/old collision handling rule(s) for a (DL) reception. The UE applies a second/new collision handling rule(s) for UL transmission. A UE applies a collision handling rule(s) for a (DL) reception. The UE does not apply collision handling rule(s) for a (DL) reception. A UE applies a first/old collision handling rule(s) for a (UL) configured transmission. The UE applies a second/new collision handling rule(s) for (UL) transmission scheduled by DCI. A UE applies a collision handling rule(s) for a (UL) configured transmission. The UE does not apply collision handling rule(s) for (UL) transmission scheduled by DCI. One example could be: for a set of symbols of a slot that are indicated to a UE as uplink by tdd-UL-DL-Configuration-Common the UE does not receive PDCCH, PDSCH, or CSI-RS when the PDCCH, PDSCH, or CSI-RS overlaps, even partially, with the set of symbols of the slot. For a set of symbols of a slot that are indicated to a UE as downlink by tdd-UL-DL-ConfigurationCommon, the UE transmits PUSCH, PUCCH, PRACH, or SRS when the PUSCH, PUCCH, PRACH, or SRS overlaps, even partially, with the set of symbols of the slot. Another example: for a set of symbols of a slot that are indicated to a UE as downlink by tdd-UL-DL-ConfigurationCommon, the UE does not transmit PUSCH, PUCCH, PRACH, or SRS when the PUSCH, PUCCH, PRACH, or SRS overlaps, even partially, with the set of symbols of the slot wherein the PUSCH, PUCCH, PRACH, or SRS are configured to transmit. For a set of symbols of a slot that are indicated to a UE as downlink by tdd-UL-DL-ConfigurationCommon, the UE does not transmit PUSCH, PUCCH, PRACH, or SRS when the PUSCH, PUCCH, PRACH, or SRS overlaps, even partially, with the set of symbols of the slot wherein the PUSCH, PUCCH, PRACH, or SRS are scheduled by a DCI.

In another embodiment, a UE applies a first collision handling rule(s). The UE applies a second collision handling rule(s). The UE determines whether to apply the first collision handling rule(s) or to apply the second collision handling rule(s) based on an indication from a base station. The indication applies to all time/frequency resources (e.g., all following resource(s) upon indication). The indication applies to a subset of time resources (e.g., certain symbol(s) or slot(s)). The indication applies to a subset of time resources (e.g., certain PRB(s)/BWP(s)). The indication could be an indication to enable duplexing enhancement. The indication could be indicated by RRC signal. The indication could be indicated by MAC CE. The indication could be indicated by a DCI. The DCI could be DCI format 2_0. The DCI could be a scheduling DCI. The indication applies to the transmission/reception scheduled by the DCI. The indication applies to all the following transmission/reception. The indication applies to a period of time. The indication applies to a period of time associated with the DCI. The indication applies to a period of time associated with the DCI format 2_0. A UE applies a first collision handling rule(s) for a first type of SFI. The UE applies a second collision handling rule(s) for a second type of SFI. The UE determines whether to apply the first collision handling rule(s) or to apply the second collision handling rule(s) based on a type of SFI. The UE applies the first collision handling rule(s) for a (first) SFI if the (first) SFI is a first type of SFI. The UE applies the second collision handling rule(s) for a (second) SFI if the (second) SFI is a second type of SFI. A type of SFI could comprise one or more of the following: SFI indicted by RRC signal, SFI indicted by common RRC signal, SFI indicted by dedicated RRC signal, SFI indicted by DCI, SFI indicted by DCI format 2_0, SFI indicated by DCI scheduling a transmission/reception, SFI indicated by RRC configuring a transmission/reception. A UE applies a first collision handling rule(s) for a first type of transmission/reception. The UE applies a second collision handling rule(s) for a second type of transmission/reception. The UE determines whether to apply the first collision handling rule(s) or to apply the second collision handling rule(s) for a transmission/reception based on a type of transmission/reception. The UE determines whether to apply the first collision handling rule(s) or to apply the second collision handling rule(s) based on a type of transmission/reception. The UE applies the first collision handling rule(s) for a (first) transmission/reception if the (first) transmission/reception is a first type of transmission/reception. The UE applies the second collision handling rule(s) for a (second) transmission/reception if the (second) transmission/reception is a second type of transmission/reception. A type of transmission/reception could be one of the following: a DL reception, a UL transmission, a configured DL reception, a DL reception scheduled by DCI, a configured UL transmission, a UL transmission scheduled by DCI.

In another embodiment, a base station applies a first collision handling rule(s) for a UE. The base station applies a second collision handling rule(s) for the UE. The base station determines whether to apply the first collision handling rule(s) or to apply the second collision handling rule(s) based on an indication to the UE. The indication applies to all time/frequency resources (e.g., all following resource(s) upon indication). The indication applies to a subset of time resources (e.g., certain symbol(s) or slot(s)). The indication applies to a subset of time resources (e.g., certain PRB(s)/BWP(s)). The indication could be an indication to enable duplexing enhancement. The indication could be indicated by RRC signal. The indication could be indicated by MAC CE. The indication could be indicated by a DCI. The DCI could be DCI format 2_0. The DCI could be a scheduling DCI. The indication applies to the transmission/reception scheduled by the DCI. The indication applies to all the following transmission/reception. The indication applies to a period of time. The indication applies to a period of time associated with the DCI. The indication applies to a period of time associated with the DCI format 2_0. A base station applies a first collision handling rule(s) for a first type of SFI for the UE. The base station applies a second collision handling rule(s) for a second type of SFI for the UE. The base station determines whether to apply the first collision handling rule(s) or to apply the second collision handling rule(s) based on a type of SFI. The base station applies the first collision handling rule(s) for a (first) SFI if the (first) SFI is a first type of SFI. The base station applies the second collision handling rule(s) for a (second) SFI if the (second) SFI is a second type of SFI. A type of SFI could comprise one or more of the following: SFI indicted by RRC signal, SFI indicted by common RRC signal, SFI indicted by dedicated RRC signal, SFI indicted by DCI, SFI indicted by DCI format 2_0, SFI indicated by DCI scheduling a transmission/reception, SFI indicated by RRC configuring a transmission/reception. A base station applies a first collision handling rule(s) for a first type of transmission/reception for a UE. The base station applies a second collision handling rule(s) for a second type of transmission/reception for a UE. The base station determines whether to apply the first collision handling rule(s) or to apply the second collision handling rule(s) for a transmission/reception based on a type of transmission/reception. The base station determines whether to apply the first collision handling rule(s) or to apply the second collision handling rule(s) based on a type of transmission/reception. The base station applies the first collision handling rule(s) for a (first) transmission/reception if the transmission/reception is a first type of transmission/reception. The base station applies the second collision handling rule(s) for a (second) transmission/reception if the transmission/reception is a second type of transmission/reception. A type of transmission/reception could be one of the following: a UL reception, a DL transmission, a configured UL reception, a UL reception scheduled by DCI, a configured DL transmission, a DL transmission scheduled by DCI.

In another embodiment, a UE receives indication of a first frequency resource(s) from a base station. The UE receives a first SFI from the base station. The first frequency resource(s) is associated with the first SFI. The UE handles reception/transmission whose frequency resource(s) is within the first frequency resource(s) based on the first SFI. The UE does not handle reception/transmission whose frequency resource(s) is not within the first frequency resource(s) based on the first SFI. The UE handles reception/transmission whose frequency resource(s) is not within the first frequency resource(s) as if the first SFI is not indicated/present. The UE cancels a configured (DL) reception on a symbol if/when the first SFI indicates the symbol as UL and frequency resource of the configured reception is within the first frequency resource(s). The UE performs a configured (DL) reception on a symbol if/when the first SFI indicates the symbol as UL and frequency resource of the configured reception is not within the first frequency resource(s). The UE cancels a configured (UL) transmission on a symbol if/when the first SFI indicates the symbol as DL and frequency resource of the configured transmission is within the first frequency resource(s). The UE performs a configured (UL) transmission on a symbol if/when the first SFI indicates the symbol as DL and frequency resource of the configured transmission is not within the first frequency resource(s). The UE does not expect to be scheduled (DL) reception on a symbol if/when the first SFI indicates the symbol as UL and frequency resource of the scheduled reception is within the first frequency resource(s). The UE is scheduled (DL) reception on a symbol if/when the first SFI indicates the symbol as UL and frequency resource of the configured reception is not within the first frequency resource(s). The UE does not expect to be scheduled (UL) transmission on a symbol if/when the first SFI indicates the symbol as DL and frequency resource of the scheduled transmission is within the first frequency resource(s). The UE is scheduled (UL) transmission on a symbol if/when the first SFI indicates the symbol as DL and frequency resource of the scheduled transmission is not within the first frequency resource(s). The UE receives indication of a second frequency resource(s).

The UE receive a second SFI. The second frequency resource is associated with the second SFI. The UE handles reception/transmission whose frequency resource(s) is within the second frequency resource(s) based on the second SFI. The UE cancels a configured (DL) reception on a symbol if/when the second SFI indicates the symbol as UL and frequency resource of the configured reception is within the second frequency resource(s). The UE cancels a configured (UL) transmission on a symbol if/when the second SFI indicates the symbol as DL and frequency resource of the configured transmission is within the second frequency resource(s). The UE does not expect to be scheduled (DL) reception on a symbol if/when the second SFI indicates the symbol as UL and frequency resource of the scheduled transmission is within the second frequency resource(s). The UE does not expect to be scheduled (UL) transmission on a symbol if/when the second SFI indicates the symbol as DL and frequency resource of the scheduled transmission is within the second frequency resource(s).

In another embodiment, a base station transmits indication of a first frequency resource(s) to a UE. The base station transmits a first SFI. The first frequency resource(s) is associated with the first SFI. The base station handles reception/transmission whose frequency resource(s) is within the first frequency resource(s) based on the first SFI. The base station does not handle reception/transmission whose frequency resource(s) is not within the first frequency resource(s) based on the first SFI. The base station handles reception/transmission whose frequency resource(s) is not within the first frequency resource(s) as if the first SFI is not indicated/present. The base station cancels a configured (DL) transmission on a symbol if/when the first SFI indicates the symbol as UL and frequency resource of the configured transmission is within the first frequency resource(s). The base station performs a configured (DL) transmission on a symbol if/when the first SFI indicates the symbol as UL and frequency resource of the configured transmission is not within the first frequency resource(s). The base station cancels a configured (UL) reception on a symbol if/when the first SFI indicates the symbol as DL and frequency resource of the configured reception is within the first frequency resource(s). The base station performs a configured (UL) reception on a symbol if/when the first SFI indicates the symbol as DL and frequency resource of the configured reception is not within the first frequency resource(s). The base station avoids scheduling (DL) transmission on a symbol if/when the first SFI indicates the symbol as UL and frequency resource of the scheduled transmission is within the first frequency resource(s). The base station schedules (DL) transmission on a symbol if/when the first SFI indicates the symbol as UL and frequency resource of the scheduled transmission is not within the first frequency resource(s). The base station avoids scheduling (UL) reception on a symbol if/when the first SFI indicates the symbol as DL and frequency resource of the scheduled reception is within the first frequency resource(s). The base station schedule (UL) reception on a symbol if/when the first SFI indicates the symbol as DL and frequency resource of the scheduled reception is not within the first frequency resource(s). The base station transmits indication of a second frequency resource(s) to the UE. The base station transmits a second SFI. The second frequency resource is associated with the second SFI. The base station handles reception/transmission whose frequency resource(s) is within the second frequency resource(s) based on the second SFI. The base station cancels a configured (DL) transmission on a symbol if/when the second SFI indicates the symbol as UL and frequency resource of the configured transmission is within the second frequency resource(s). The base station cancels a configured (UL) reception on a symbol if/when the second SFI indicates the symbol as DL and frequency resource of the configured reception is within the second frequency resource(s). The base station avoids scheduling (DL) transmission on a symbol if/when the second SFI indicates the symbol as UL and frequency resource of the scheduled transmission is within the second frequency resource(s). The base station avoids scheduling (UL) reception on a symbol if/when the second SFI indicates the symbol as DL and frequency resource of the scheduled reception is within the second frequency resource(s).

In another embodiment, a UE receives indication of a first frequency resource(s) from a base station. The UE receives a first SFI. The first frequency resource(s) is not associated with the first SFI. The UE does not handle reception/transmission whose frequency resource(s) is within the first frequency resource(s) based on the first SFI. The UE handles reception/transmission whose frequency resource(s) is within the first frequency resource(s) as if the first SFI is not indicated/present. The UE handles reception/transmission whose frequency resource(s) is not within the first frequency resource(s) based on the first SFI. The UE cancels a configured (DL) reception on a symbol if/when the first SFI indicates the symbol as UL and frequency resource of the configured reception is not within the first frequency resource(s). The UE performs a configured (DL) reception on a symbol if/when the first SFI indicates the symbol as UL and frequency resource of the configured reception is within the first frequency resource(s). The UE cancels a configured (UL) transmission on a symbol if/when the first SFI indicates the symbol as DL and frequency resource of the configured transmission is not within the first frequency resource(s). The UE performs a configured (UL) transmission on a symbol if/when the first SFI indicates the symbol as DL and frequency resource of the configured reception is within the first frequency resource(s). The UE does not expect to be scheduled (DL) reception on a symbol if/when the first SFI indicates the symbol as UL and frequency resource of the scheduled reception is not within the first frequency resource(s). The UE is scheduled (DL) reception on a symbol if/when the first SFI indicates the symbol as UL and frequency resource of the scheduled reception is within the first frequency resource(s). The UE does not expect to be scheduled (UL) transmission on a symbol if/when the first SFI indicates the symbol as DL and frequency resource of the scheduled transmission is not within the first frequency resource(s). The UE is scheduled (UL) transmission on a symbol if/when the first SFI indicates the symbol as DL and frequency resource of the scheduled transmission is within the first frequency resource(s).

In another embodiment, a base station transmits indication of a first frequency resource(s) to a UE. The base station transmits a first SFI. The first frequency resource(s) is not associated with the first SFI. The base station does not handle reception/transmission whose frequency resource(s) is within the first frequency resource(s) based on the first SFI. The base station handles reception/transmission whose frequency resource(s) is within the first frequency resource(s) as if the first SFI is not indicated/present. The base station handles reception/transmission whose frequency resource(s) is not within the first frequency resource(s) based on the first SFI. The base station cancels a configured (DL) transmission on a symbol if/when the first SFI indicates the symbol as UL and frequency resource of the configured transmission is not within the first frequency resource(s). The base station performs a configured (DL) transmission on a symbol if/when the first SFI indicates the symbol as UL and frequency resource of the configured transmission is within the first frequency resource(s). The base station cancels a configured (UL) reception on a symbol if/when the first SFI indicates the symbol as DL and frequency resource of the configured reception is not within the first frequency resource(s). The base station performs a configured (UL) reception on a symbol if/when the first SFI indicates the symbol as DL and frequency resource of the configured reception is within the first frequency resource(s). The base station avoids scheduling (DL) transmission on a symbol if/when the first SFI indicates the symbol as UL and frequency resource of the scheduled transmission is not within the first frequency resource(s). The base station schedules (DL) transmission on a symbol if/when the first SFI indicates the symbol as UL and frequency resource of the scheduled transmission is within the first frequency resource(s). The base station avoids scheduling (UL) reception on a symbol if/when the first SFI indicates the symbol as DL and frequency resource of the scheduled reception is not within the first frequency resource(s). The base station schedules (UL) reception on a symbol if/when the first SFI indicates the symbol as DL and frequency resource of the scheduled reception is within the first frequency resource(s).

In various embodiments, collision handling rule(s) could be replaced with action(s) related to collision handling or behavior(s) related to collision handling.

In various embodiments, SFI could be replaced with a transmission direction.

In various embodiments, a transmission direction could be replaced with SFI.

In various embodiments, the invention describes behavior or operation of a single serving cell unless otherwise noted.

In various embodiments, the invention describes behavior or operation of multiple serving cells unless otherwise noted.

In various embodiments, the invention describes behavior or operation of a single bandwidth part unless otherwise noted.

In various embodiments, a base station configures multiple bandwidth parts to the UE unless otherwise noted.

In various embodiments, a base station configures a single bandwidth part to the UE unless otherwise noted.

Figure 6:
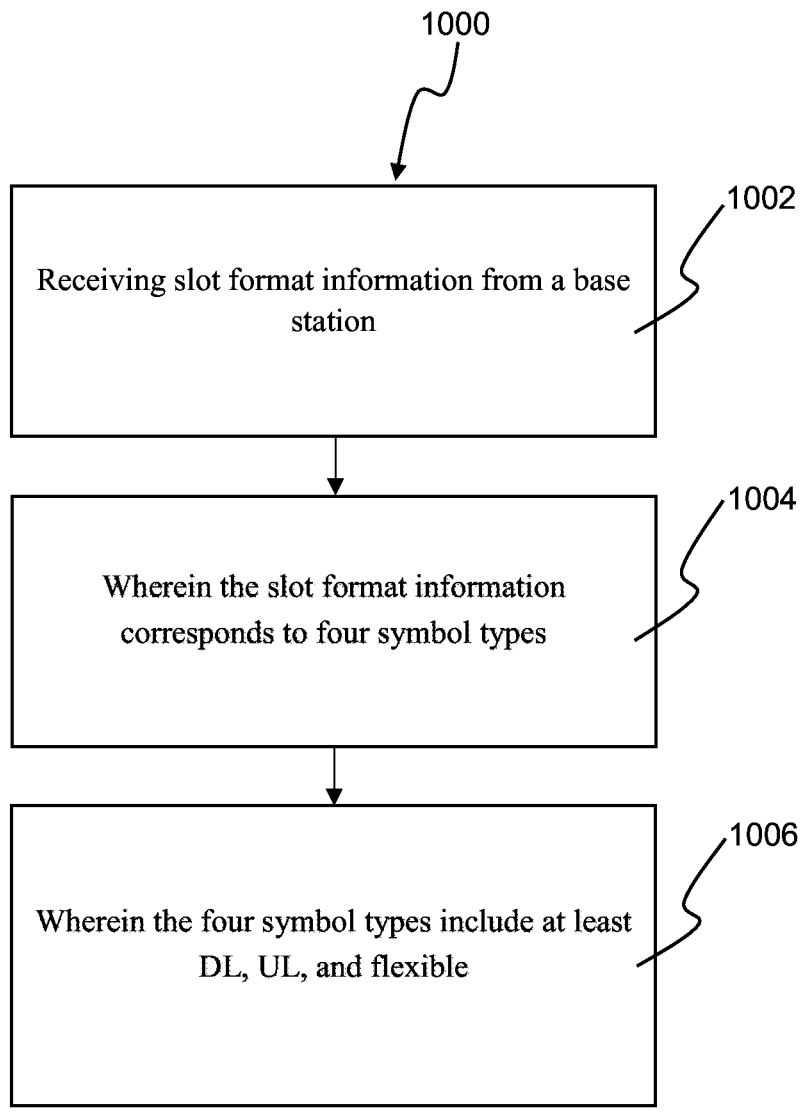
FIG. 6 is a flow diagram of a UE receiving slot format information from a base station, in accordance with embodiments of the present invention.

Referring to FIG. 6, with this and other concepts, systems, and methods of the present invention, a method 1000 for a UE in a wireless communication system comprises receiving slot format information from a base station (step 1002), wherein the slot format information corresponds to four symbol types (step 1004), and wherein the four symbol types include at least DL, UL, and flexible (step 1006).

In various embodiments, the fourth symbol type is different from DL/UL and flexible.

In various embodiments, the fourth symbol type is one of "N", "Neutral", "B", "Bi-direction", "Bypass", "X", "Special", "T", "Transparent", "Free", "duplexing", "Full duplex", or "Flexible duplex".

In various embodiments, the UE is allowed to perform transmission and reception on symbols indicated as the fourth symbol type. The UE could operate in paired spectrum and/or TDD system.

In various embodiments, the UE performs transmission and reception simultaneously on symbols indicated as the fourth symbol type.

In various embodiments, the UE performs a first handling on transmission/reception on symbols indicated as the fourth symbol type and performs a second on transmission/reception on symbols indicated as flexible, DL or UL.

In various embodiments, the fourth symbol type overrides DL.

In various embodiments, the fourth symbol type overrides UL.

In various embodiments, the fourth symbol type overrides Flexible.

In various embodiments, the fourth symbol type indicated by DCI format 2_0 overrides DL configured by a RRC signal.

In various embodiments, the fourth symbol type indicated by DCI format 2_0 overrides UL configured by a RRC signal.

In various embodiments, DL is not allowed to override the fourth symbol type.

In various embodiments, UL is not allowed to override the fourth symbol type.

In various embodiments, Flexible is not allowed to override the fourth symbol type.

In various embodiments, DL indicated by DCI format 2_0 is not allowed to override the fourth symbol type indicated by RRC.

In various embodiments, UL indicated by DCI format 2_0 is not allowed to override the fourth symbol type indicated by RRC.

In various embodiments, Flexible indicated by DCI format 2_0 is not allowed to override the fourth symbol type indicated by RRC.

Referring back to FIGS. 3 and 4, in one or more embodiments from the perspective of a UE, the device 300 includes a program code 312 stored in memory 310 of the transmitter. The CPU 308 could execute program code 312 to: (i) receive slot format information from a base station; (ii) wherein the slot format information corresponds to four symbol types; and (iii) wherein the four symbol types include at least DL, UL, and flexible. Moreover, the CPU 308 can execute the program code 312 to perform all of the described actions, steps, and methods described above, below, or otherwise herein.

Figure 7:
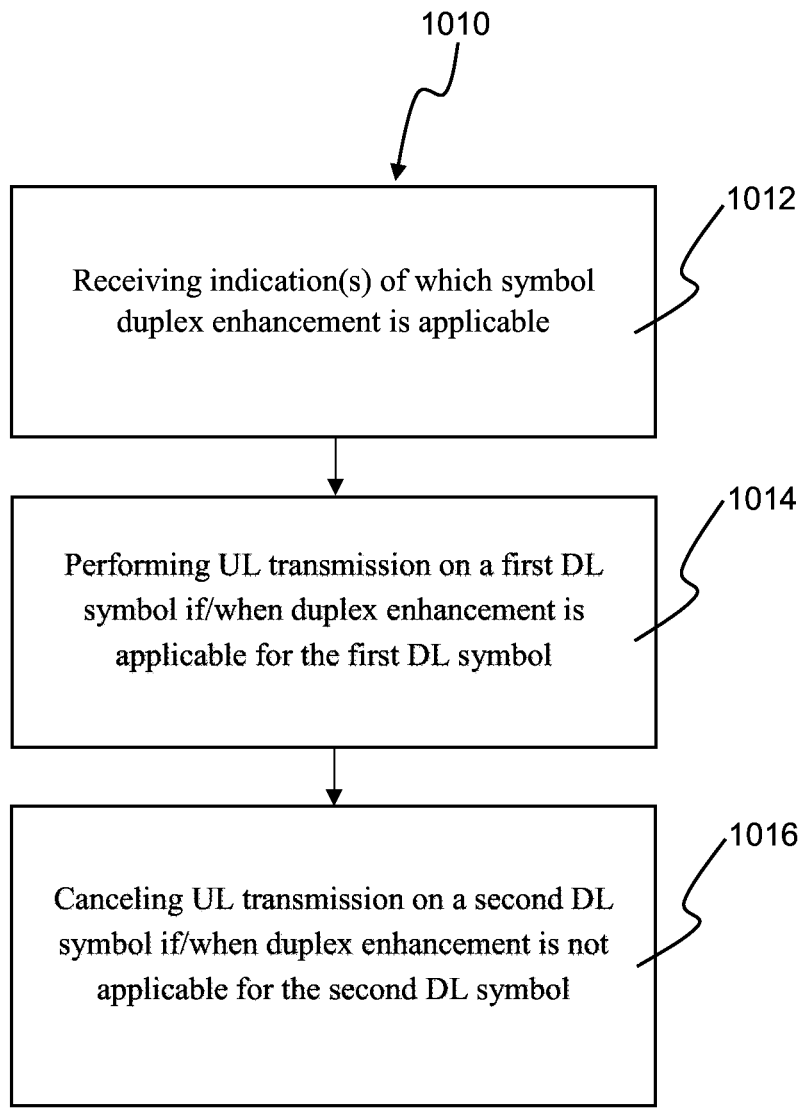
FIG. 7 is a flow diagram of a UE receiving indication(s) of which symbol duplex enhancement is applicable, in accordance with embodiments of the present invention.

Referring to FIG. 7, with this and other concepts, systems, and methods of the present invention, a method 1010 for a UE in a wireless communication system comprises receiving indication(s) of which symbol duplex enhancement is applicable (step 1012), performing UL transmission on a first DL symbol if/when duplex enhancement is applicable for the first DL symbol (step 1014), and canceling UL transmission on a second DL symbol if/when duplex enhancement is not applicable for the second DL symbol (step 1016).

In various embodiments, UL transmission and DL reception are allowed on a symbol if/when duplex enhancement is applicable for the symbol. The UE could operate in paired spectrum and/or TDD system.

In various embodiments, the first DL symbol and/or the second DL symbol is configured as DL by a RRC signal.

In various embodiments, indication(s) of which symbol duplex enhancement is applicable is indicated by SFI.

In various embodiments, indication(s) of which symbol duplex enhancement is applicable is indicated by a fourth symbol type other than DL/UL/flexible.

In various embodiments, the fourth symbol type overrides DL configured by RRC signal.

In various embodiments, the fourth symbol type overrides flexible configured by RRC signal.

In various embodiments, the UE performs UL transmission on a DL symbol configured by RRC signal overridden by the fourth symbol type.

In various embodiments, the UE does not perform UL transmission on a DL symbol configured by RRC signal not overridden by the fourth symbol type.

In various embodiments, a DL symbol or a flexible symbol can be indicated applicable for duplex enhancement and/or an UL symbol is not allowed to be indicated applicable for duplex enhancement.

Referring back to FIGS. 3 and 4, in one or more embodiments from the perspective of a UE, the device 300 includes a program code 312 stored in memory 310 of the transmitter. The CPU 308 could execute program code 312 to: (i) receive indication(s) of which symbol duplex enhancement is applicable (ii) perform UL transmission on a first DL symbol if/when duplex enhancement is applicable for the first DL symbol, and (iii) cancel UL transmission on a second DL symbol if/when duplex enhancement is not applicable for the second DL symbol. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
receiving one or more indications of which symbol duplex enhancement is applicable, wherein a Downlink (DL) symbol or a flexible symbol can be indicated applicable for duplex enhancement and an Uplink (UL) symbol is not allowed to be indicated applicable for duplex enhancement;
performing UL transmission on a first one or more DL symbols if duplex enhancement is applicable for the first one or more DL symbols as indicated by the one or more indications; and
cancelling UL transmission on a second one or more DL symbols if duplex enhancement is not applicable for the second one or more DL symbols as indicated by the one or more indications.

2. The method of claim 1, wherein UL transmission and DL reception are allowed on one or more symbols if duplex enhancement is applicable for the one or more symbols.

3. The method of claim 1, wherein the first one or more DL symbols and/or the second one or more DL symbols is configured as DL by a Radio Resource Control (RRC) signal.

4. The method of claim 1, wherein the one or more indications is indicated by Slot Format Indicator (SFI).

5. The method of claim 1, wherein the one or more indications is indicated by a fourth symbol type other than DL, UL, or flexible.

6. The method of claim 5, wherein the fourth symbol type overrides DL configured by a RRC signal.

7. The method of claim 5, wherein the fourth symbol type overrides flexible configured by a RRC signal.

8. The method of claim 5, further comprising performing UL transmission on one or more DL symbols configured by a RRC signal overridden by the fourth symbol type.

9. The method of claim 5, further comprising not performing UL transmission on one or more DL symbols configured by a RRC signal not overridden by the fourth symbol type.

10. A User Equipment (UE), comprising:
a memory; and
a processor operatively coupled to the memory, wherein the processor is configured to execute a program code to:
receive one or more indications of which symbol duplex enhancement is applicable, wherein a Downlink (DL) symbol or a flexible symbol can be indicated applicable for duplex enhancement and an Uplink (UL) symbol is not allowed to be indicated applicable for duplex enhancement;

perform UL transmission on a first one or more DL symbols if duplex enhancement is applicable for the first one or more DL symbols as indicated by the one or more indications; and cancel UL transmission on a second one or more DL symbols if duplex enhancement is not applicable for the second one or more DL symbols as indicated by the one or more indications.

11. The UE of claim 10, wherein UL transmission and DL reception are allowed on one or more symbols if duplex enhancement is applicable for the symbol.

12. The UE of claim 10, wherein the first one or more DL symbols and/or the second one or more DL symbols is configured as DL by a Radio Resource Control (RRC) signal.

13. The UE of claim 10, wherein the one or more indications is indicated by Slot Format Indicator (SFI).

14. The UE of claim 10, wherein the one or more indications is indicated by a fourth symbol type other than DL, UL, or flexible.

15. The UE of claim 14, wherein the fourth symbol type overrides DL configured by a RRC signal.

16. The UE of claim 14, wherein the fourth symbol type overrides flexible configured by a RRC signal.

17. The UE of claim 14 wherein the processor is further configured to execute the program code to perform UL transmission on one or more DL symbols configured by a RRC signal overridden by the fourth symbol type.

18. The UE of claim 14, wherein the processor is configured to execute the program code to not perform UL transmission on one or more DL symbols configured by a RRC signal not overridden by the fourth symbol type.

* * * * *